United States Patent
Okuda et al.

(10) Patent No.: US 10,364,366 B2
(45) Date of Patent: *Jul. 30, 2019

(54) WATER-BASED INK FOR INK-JET RECORDING AND INK CARTRIDGE

(71) Applicant: Brother Kogyo Kabushiki Kaisha, Nagoya-shi, Aichi-ken (JP)

(72) Inventors: Satoshi Okuda, Inazawa (JP); Mitsunori Maeda, Nagoya (JP); Yuki Okumura, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 138 days.

This patent is subject to a terminal disclaimer.

(21) Appl. No.: 15/252,716

(22) Filed: Aug. 31, 2016

(65) Prior Publication Data

US 2017/0088729 A1    Mar. 30, 2017

(30) Foreign Application Priority Data

Sep. 30, 2015  (JP) ................................ 2015-195499
Mar. 18, 2016  (JP) ................................ 2016-055000

(51) Int. Cl.
| | | |
|---|---|---|
| C09D 11/328 | (2014.01) | |
| C09D 11/322 | (2014.01) | |
| C09D 11/102 | (2014.01) | |
| C09D 11/106 | (2014.01) | |

(52) U.S. Cl.
CPC .......... *C09D 11/328* (2013.01); *C09D 11/106* (2013.01); *C09D 11/322* (2013.01)

(58) Field of Classification Search
CPC .... C09D 11/328; C09D 11/322; C09D 11/102
USPC .......... 106/31.28, 31.48, 31.58, 31.77, 31.86
See application file for complete search history.

(56) References Cited

U.S. PATENT DOCUMENTS

| | | | |
|---|---|---|---|
| 5,599,386 A | 2/1997 | Sano et al. | |
| 6,176,908 B1* | 1/2001 | Bauer | C09D 11/32 106/31.28 |
| 6,503,317 B1* | 1/2003 | Ortalano | C09D 11/322 106/31.28 |
| 7,267,716 B2* | 9/2007 | Nagashima | C09D 11/38 106/31.28 |
| 7,713,343 B2* | 5/2010 | Goto | C09D 11/40 106/31.48 |
| 7,727,321 B2* | 6/2010 | Goto | C09D 11/328 106/31.48 |
| 8,016,404 B2 | 9/2011 | Kato et al. | |
| 8,021,470 B2* | 9/2011 | Taniguchi | C09D 11/328 106/31.48 |
| 8,858,695 B2 | 10/2014 | Gu et al. | |
| 9,790,389 B2* | 10/2017 | Okumura | C09D 11/322 |
| 2003/0000419 A1* | 1/2003 | Takemoto | C09D 11/322 106/31.28 |
| 2003/0136299 A1* | 7/2003 | Chien | C09D 11/328 106/31.27 |
| 2004/0206271 A1* | 10/2004 | Randler | C09D 11/326 106/31.28 |
| 2005/0022695 A1* | 2/2005 | Yokoyama | C09D 11/322 106/31.28 |
| 2005/0039633 A1* | 2/2005 | Aoyama | C09D 11/50 106/31.28 |
| 2005/0115464 A1* | 6/2005 | Coughlin | C09B 67/0033 106/31.28 |
| 2007/0100023 A1 | 5/2007 | Burns et al. | |
| 2007/0100024 A1 | 5/2007 | Gu et al. | |
| 2007/0151479 A1* | 7/2007 | Hasemann | C09D 11/328 106/31.48 |
| 2008/0241398 A1 | 10/2008 | Kato et al. | |
| 2016/0075880 A1 | 3/2016 | Gu et al. | |
| 2017/0174920 A1* | 6/2017 | Cai | C09D 11/328 |
| 2017/0267890 A1* | 9/2017 | Tsuzaka | C09D 11/328 |

FOREIGN PATENT DOCUMENTS

| | | | |
|---|---|---|---|
| JP | 56155262 | * | 12/1981 |
| JP | H08-073791 A | | 3/1996 |
| JP | 08218019 A | * | 8/1996 |
| JP | H10-036731 A | | 2/1998 |
| JP | 2008-246821 A | | 10/2008 |
| JP | 2009-515007 A | | 4/2009 |

OTHER PUBLICATIONS

English translation of JP 08/218019, Aug. 1996; 15 pages.*

* cited by examiner

*Primary Examiner* — Helene Klemanski
(74) *Attorney, Agent, or Firm* — Banner & Witcoff, Ltd.

(57) ABSTRACT

There is provided a water-based ink for ink-jet recording containing: water; at least one of quinacridone and a derivative thereof; and a dye represented by the following formula (1).

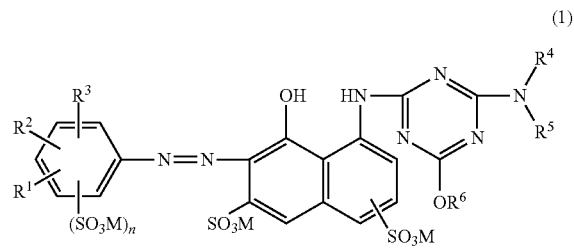

(1)

20 Claims, 2 Drawing Sheets

LEVEL 1　　　　　LEVEL 2　　　　　LEVEL 3　　　　　LEVEL 4
(Slit width: 2 dots) (Slit width: 4 dots) (Slit width: 6 dots) (Slit width: 8 dots)

LEVEL 5　　　　　LEVEL 6　　　　　LEVEL 7　　　　　LEVEL 8
(Slit width: 10 dots) (Slit width: 12 dots) (Slit width: 14 dots) (Slit width: 16 dots)

LEVEL 9　　　　　LEVEL 10　　　　　LEVEL 11　　　　　LEVEL 12
(Slit width: 18 dots) (Slit width: 20 dots) (Slit width: 22 dots) (Slit width: 24 dots)

LEVEL 13　　　　　LEVEL 14　　　　　LEVEL 15　　　　　LEVEL 16
(Slit width: 26 dots) (Slit width: 28 dots) (Slit width: 30 dots) (Exceeding Level 15)

WATER-BASED INK FOR INK-JET RECORDING AND INK CARTRIDGE

CROSS REFERENCE TO RELATED APPLICATION

The present application claims priorities from Japanese Patent Application No. 2015-195499, filed on Sep. 30, 2015 and Japanese Patent Application No. 2016-055000, filed on Mar. 18, 2016, the disclosures of which are incorporated herein by reference in their entireties.

BACKGROUND OF THE INVENTION

Field of the Invention

The present invention relates to a water-based ink for ink-jet recording and an ink cartridge.

Description of the Related Art

As a water-based ink for ink-jet recording excellent in the color tone as magenta, a water-based ink containing a quinacridone derivative and a xanthene based compound is proposed (see, for example, Japanese Patent Application Laid-open No. H10-36731).

A water-based ink using the magenta pigment such as the quinacridone derivative, etc., however, has such a problem that the chromogenic property thereof is not sufficient. As a solution to this problem, it is possible to conceive a water-based magenta ink using, as the colorant, the quinacridone derivative together with a magenta dye. Although this water-based magenta ink is excellent in the chromogenic property, a phenomenon called "migration", in which the colorant seeps to or comes through an edge or periphery of a recorded portion of a recording medium after a recording is performed on the recording medium, is prominent in the water-based magenta ink.

In view of the above situation, an object of the present teaching is to provide a water-based ink for ink-jet recording capable of realizing both of the improvement in chromogenic property and the suppression of migration.

SUMMARY OF THE INVENTION

According to a first aspect of the present teaching, there is provided a water-based ink for ink-jet recording containing:
water;
at least one of quinacridone and a derivative thereof; and
a dye represented by the following formula (1):

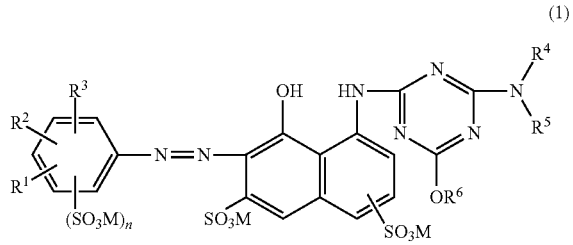

(1)

wherein in the formula (1),
"n" is 0, 1 or 2;
each of $R^1$, $R^2$ and $R^3$ is one selected from the group consisting of: a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, a sulfonate group, a substituted or non-substituted alkylsulfonyl group, a substituted or non-substituted arylsulfonyl group, a carboxy group and a carboxylate group;

$R^1$, $R^2$ and $R^3$ are same as one another or different from one another;

each of $R^4$, $R^5$ and $R^6$ is one selected from the group consisting of: a hydrogen atom, a substituted or non-substituted alkyl group, a substituted or non-substituted alkenyl group, a substituted or non-substituted aryl group, a substituted or non-substituted aralkyl group, a substituted or non-substituted alicyclic group, and a substituted or non-substituted heterocyclic group;

$R^4$, $R^5$ and $R^6$ are same as one another or different from one another;

each of three Ms is one selected from the group consisting of: H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, and $C_2H_4NH_2$; and the three Ms are same as one another or different from one another.

According to a second aspect of the present teaching, there is provided an ink cartridge comprising the water-based ink for ink-jet recording of the first aspect.

DESCRIPTION OF THE PREFERRED EMBODIMENTS

Figure 1:
FIG. 1 is a view for explaining a method for measuring migration level of a water-based ink for ink-jet recording in the present teaching.
Figure 1:
Figure 1:
Figure 1:
Figure 1:
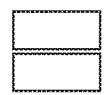
Figure 1:
Figure 1:
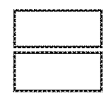
Figure 1:
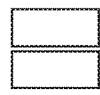
Figure 1:
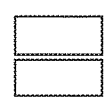
Figure 1:
Figure 1:
Figure 1:
Figure 1:
Figure 1:
Figure 1:
Figure 1:

In this specification, "at least one of methacrylic acid and acrylic acid" is described as "(meth)acrylic acid" in some cases; similarly, "at least one of methacrylate and acrylate" is described as "(meth)acrylate" in some cases; and "at least one of methacrylonitrile and acrylonitrile" is described as "(meth)acrylonitrile" in some cases. Further, in this specification, the number of monomers in a polymer is described, for example, as (n=not less than 1), (m=not less than 1), etc., in some cases. Here, in a case that "n" and "m" are both not less than 1, then it is meant that such a substance is not limited to a polymer, but may be a monomer as well. Furthermore, in the specification, in a case for example that ethylene glycol monomethyl ether and ethylene glycol monoethyl ether may be used, the description is made such as ethylene glycol monomethyl (or ethyl) ether, etc.

The water-based ink for ink-jet recording (hereinafter referred to as "water-based ink" or "ink", in some cases) related to the present teaching will be explained as follows. The water-based ink for ink-jet recording related to the present teaching contains a colorant and water.

The colorant contains at least one of quinacridone and a derivative thereof as a pigment, and a dye represented by the following formula (1).

At least one of the quinacridone and the derivative thereof is exemplified, for example, by a compound represented by the following formula (2), etc.:

$$X_s\text{-}Q\text{-}Y_t \qquad (2)$$

In the formula (2), "Q" represents a quinacridone residue (moiety) or quinacridone quinone residue (moiety); each of X and Y represents a hydrogen atom, a methyl group, a chloro group or a methoxy group; X and Y may be same as or different from each other; each of "s" and "t" may be an integer ranging from 1 to 4, and may be same as or different from each other.

A specific example of at least one of the quinacridone and the derivative thereof represented by the formula (2) includes, for example, non-substituted quinacridone, 2,9-dimethylquinacridone, 2,9-dichloroquinacridone, 2,9-dimethoxyquinacridone, 3,10-dimethylquinacridone, 3,10-dichloroquinacridone, 3,10-dimethoxyquinacridone, 4,11-dimethylquinacridone, 4,11-dichloroquinacridone, 4,11-dimethoxyquinacridone, quinacridone quinone, etc. More specific example of the quinacridone and the derivative thereof represented by the formula (2) includes, for example, C.I. Pigment Reds 122, 202, 206, 207 and 209; C. I. Pigment Violets 19 and 42; and a solid solution thereof. Among these substances, C. I. Pigment Red 122 is preferred in view of the improvement in chromogenic property (hue angle). The solid solution is exemplified, for example, by a solid solution containing two kinds of pigments which are C. I. Pigment Red 122 and C. I. Pigment Violet 19, a solid solution containing two kinds of pigments which are C. I. Pigment Red 202 and C. I. Pigment Violet 19, and the like. As at least one of the quinacridone and the derivative thereof, it is allowable to use only one kind of the above-described compounds, or to use two or more kind of the above-described compounds may be used in a mixed manner.

The water-based ink related to the present teaching further contains a pigment dispersant, and at least one of the quinacridone and the derivative thereof may be dispersed in water by the pigment dispersant. As the pigment dispersant, it is allowable to use, for example, a general polymeric dispersant (resin for dispersing pigment, pigment-dispersing resin), etc. Further, as the pigment dispersant, it is allowable to use, for example, a pigment-dispersing resin which contains an ethylene oxide chain. The quinacridone or the derivative thereof may be of self-dispersible type. At least one of the self-dispersible quinacridone and the derivative thereof is dispersible in water without using any pigment dispersant, for example, owing to the fact that at least one of a hydrophilic functional group and the salt thereof including, for example, carbonyl group, hydroxyl group, carboxylic acid group, sulfonic acid group (sulfonate group), phosphoric acid group (phosphate group), etc. is introduced into the surfaces of the particles of at least one of the self-dispersible quinacridone and the derivative thereof by the chemical bond directly or with any group intervening therebetween. In view of the storing stability, in the water-based ink related to the present teaching, at least one of the quinacridone and the derivative thereof is preferably dispersed in water by the pigment dispersant.

Although the structure of the resin for dispersing pigment (pigment dispersant) containing ethylene oxide chain is not particularly limited provided that the pigment dispersant contains the ethylene oxide chain, the structure is, for example, as explained below.

As the pigment dispersant, a polymer obtained by polymerizing a monomer having an α, β-unsaturated bond (hereinafter referred to simply as "monomer") is used. This polymer contains, as a constituent component thereof, at least a monomer having an acidic group such as carboxyl group, sulfonic acid group, phosphate group, etc., and introduces thereinto a monomer having a hydroxyl group and/or ethylene oxide chain as necessary. The polymer is a hydrophilic polymer that is soluble, dispersible or emulsifiable in water by neutralizing the acidic group with the alkaline to be ionized.

Firstly, the monomer having the acidic group is not particularly limited and is exemplified, for example, by: vinyl-based monomers such as vinyl benzoic acid, styrene-sulfonic acid, vinyl sulfonic acid, etc.; (meth)acrylic acid-based monomers such as (meth)acrylic acid, monomethacyrliate of a dibasic acid obtained by reacting a hydroxyl group of such as (meth)acrylic acid-2-hydroxyethyl, (meth)acrylic acid-2-hydroxypropyl, etc., with a phthalic acid a succinic acid, etc., methacrylic acid ethylsulfonic acid, (meth)acryloyloxyethyl monophosphonate, etc.; and monomers having 2 carboxyl groups such as maleic acid, itaconic acid, etc.; amide-based monomers such as (meth)acrylamide methyl propanesulfonic acid, etc. One or more kinds of these monomers can be used. By neutralizing the polymer having one or more kinds of the monomer having the acidic group introduced thereinto, with an alkali, the hydrophilicity of the polymer is enhanced so that the polymer can be dissolved, dispersed or emulsified in the water.

The alkali is not particularly limited. The alkali can be exemplified by ammonia; organic amines such as trimethylamine, triethylamine, dimethyl aminoethanol, aminoethanol, diethanolamine, triethanolamine, aminomethylpropanol, etc.; alkali metal hydroxides such as lithium hydroxide, sodium hydroxide, potassium hydroxide, etc.; and the like, and the alkali neutralizes the introduced acidic group. The neutralization rate by the alkali is not particularly limited, and is adjusted in accordance with a necessary pH required for the usage and/or application by neutralizing all of, or a part of the acidic group(s) introduced into the polymer, or by excessively neutralizing the introduced acidic group(s).

Further, a monomer having a hydroxyl group and/or an ethylene oxide chain can be used in order to impart the hydrophilicity. The monomer is not particularly limited, and the usable monomer is exemplified by: (meth)acrylates having a hydroxyl group such as (meth)acrylic acid-2-hydroxyethyl, (meth)acrylic acid-2-hydroxypropyl, glycol mono(meth)acrylate, etc.; polyalkylene glycol monomethacrylates such as poly (n=not less than 2) ethylene glycol monomethacrylate, poly (n=not less than 2) propylene glycol monomethacrylate, poly (n=not less than 1) ethyleneglycol poly (m=not less than 1) propylene glycol mono(meth) acrylate, etc.; (meth)acrylates of which hydroxyl group is esterified by an fatty acid and/or an aromatic carboxylic acid; alkoxy or allyloxy polyalkylene glycol (meth)acrylates such as methoxy poly(n=not less than 1) ethylene glycol (meth)acrylate, ethoxy poly (n=not less than 1) ethylene glycol (meth)acrylate, dodecyl poly (n=not less than 1) ethylene glycol (meth)acrylate, phenoxy poly (n=not less than 1) ethylene glycol (meth)acrylate, nonylphenylpoly (n=not less than 1) ethylene glycol (meth)acrylate, methacrylic acid poly (n=not less than 1) ethylene glycol monocumyl ether, etc. Other than these, monomers having a polymerizable group and imparting the hydrophilicity such as a vinyl-based monomer, aryl-based monomer, a reactive surfactant, etc. may be used.

As the pigment dispersant related to the present teaching, a pigment dispersant having such a configuration in which a monomer having an acidic group is singly used, or the monomer having the acidic group is used in combination with a monomer imparting the hydrophilicity is preferably used. In particular, the configuration wherein the monomer having the acidic group is used in combination with the monomer imparting the hydrophilicity is effective for realizing the storing stability of an ink. Further, another configuration wherein other monomer is polymerized so as to adjust the hydrophilicity and to thereby impart the water resistance, is also capable of further improving the pigment dispersibility at the same time.

The other monomer is not particularly limited, and is exemplified by vinyl-based monomers such as styrene, vinyl toluene, vinyl ethylbenzene, α-methyl styrene, vinyl naphthalene, vinyl biphenyl, (meth)acrylonitrile, vinyl caprolactone, vinyl carbazole, vinyl pyrrolidone, etc.; methacrylates such as (meth)acrylic acid methyl, (meth)acrylic acid ethyl, (meth)acrylic acid propyl, (meth)acrylic acid butyl, (meth)acrylic acid hexyl, (meth)acrylic acid octyl, (meth)acrylic acid 2-ethylhexyl, (meth)acrylic acid decyl, (meth)acrylic acid dodecyl, (meth)acrylic acid tridecyl, (meth)acrylic acid octadecyl, (meth)acrylic acid behenyl, (meth)acrylic acid cyclohexyl, (meth)acrylic acid t-butyl cyclohexyl, (meth)acrylic acid trimethyl cyclohexyl, (meth)acrylic acid tricyclodecyl, (meth)acrylic acid isobornyl, (meth)acrylic acid adamantyl, (meth)acrylic acid benzyl, (meth)acrylic acid phenyl, (meth)acrylic acid naphthyl, (meth)acrylic acid dimethyl aminoethyl, (meth)acrylic acid diethyl aminoethyl, and as necessary, (meth)acrylate of quaternary ammonium salt type, etc.; alkanoic acid vinyl ester-based monomers such as vinyl acetate, vinyl propionate, etc.; amide-based monomers such as (meth)acrylamide, dimethyl (meth)acrylamide, etc.; and the like. One or more kinds of these monomers is/are used to thereby adjust the hydrophilicity and impart the pigment dispersibility. Further, as necessary, it is allowable to use a polymer-type monomer of polystyrene modified to have an unsaturated group at one terminal thereof, a macromonomer, etc.

The polymer as the pigment dispersant related to the present teaching has the above-described monomer composition of which structure is not limited and includes, for example, random structure, alternating copolymerization structure, block structure, gradient structure, grafted structure, multi-branched structure, etc. The block structure and the grafted structure are particularly preferred. Regarding the block structure, by providing a block copolymer having a water-insoluble chain and a water-soluble chain, the adsorbing property of a polymer composed of the water-insoluble chain to the pigment is improved, thereby maintaining superior micro-dispersibility and stability.

The polymer as the pigment dispersant used in the present teaching is composed of the above-described monomer. An introduction amount of the monomer having an acidic group necessary for imparting the hydrophilicity can be defined by an acid value. The acid value can be plainly expressed as the mass of potassium hydroxide (KOH) in milligrams required to neutralize 1 (one) gram of the polymer. For example, the acid value can be calculated by dissolving a predetermined amount of the polymer in a mixed organic solvent of toluene and ethanol in which toluene/ethanol=1/1, and by performing titration with a 0.1N potassium hydroxide-ethanol solution, with phenolphthalein as an indicator. The acid value of the polymer used in the present teaching is preferably in a range of 40 mgKOH/g to 200 mgKOH/g, more preferably in a range of 50 mgKOH/g to 150 mgKOH/g, further more preferably in a range of 50 mgKOH/g to 130 mgKOH/g. In a case that the acid value is less than 40 mgKOH/g, the water solubility is not sufficient, this leads to insufficient storing stability and/or insufficient hydrophilicity of the pigment, thus resulting, in some cases, in insufficient redissolvability that is an action causing an ink for ink-jet recording to re-disperse after being dried. On the other hand, in a case that the acid value is more than 200 mgKOH/g, this leads to lowered storing stability of the ink and/or insufficient water resistance of a printed matter formed by the ink, in some cases. Note that, however, the hydrophilicity, the redissolvability, the water resistance, etc. may be adjusted as necessary in view of the solvent environment, etc, thus an aspect is also preferable depending on the usage, in which the acid value of the polymer is adjusted to be the outside of the above-described range. Further, in the method for adjusting the monomer composition, it is preferred that the hydrophilic monomer as described above is a component (constituent) in a case that the acid value is low. In addition, it is preferred that the hydrophilic monomer is a component (constituent) in order to also provide the water solubility. The introducing amount of the hydrophilic monomer is not particularly limited, and may be designed to be any amount depending on the characteristic of usage.

Next, the molecular weight of the pigment dispersant used in the present teaching is not particularly limited. Here, the term "molecular weight" is number-average molecular weight which is polystyrene conversion number-average molecular weight by a gel permeation chromatography, or weight-average molecular weight. In the present teaching, the molecular weight means the number-average molecular weight. The molecular weight is in a range of 1,000 to 100,000, more preferably in a range of 5,000 to 50,000, further more preferably in a range of 5,000 to 20,000. In a case that the molecular weight is less than 1,000, the molecular weight is so small that any detachment (desorption) of the pigment occurs, and/or that the pigment is dissolved in an organic solvent in an ink for ink-jet recording, which in turn makes it impossible to maintain the dispersibility and/or the storing stability of the pigment, in some cases. On the other hand, in a case that the molecular weight is more than 100,000, the viscosity of the ink is increased in some cases, and/or any microdispersibility cannot be realized, in some cases, due to the adsorption between many particles of the pigment. The molecular weight distribution (weight-average molecular weight/number-average molecular weight, PDI) is not particularly limited. In a case that the molecular weight distribution is not more than 1.5, the molecular weights are uniform, which in turn makes the properties of the polymer molecules be uniform, thereby improving the pigment dispersibility. In a case that the molecular weight distribution exceeds 1.5, polymer molecules of a low molecular weight and polymer molecules of a high molecular weight are consequently included. However, the polymer molecules of the low molecular weight contribute to the wettability of the pigment, and the polymer molecules of the high molecular weight are not dissolved in a liquid medium of the ink for ink-jet recording due to large molecular weight thereof, and adsorb to the pigment; in such a case, the polymer molecules of the high molecular weight do not detach from the pigment, thereby improving the storing stability of the pigment and/or preventing the pigment from penetrating through paper, resulting in an improved chromogenic property.

These monomers as described above are polymerized as the components of a polymer, so as to obtain the polymer as the pigment dispersant. The polymerization method is not particularly limited, and any conventionally known polymerization method can be used. Specifically, the polymerization method includes radical polymerization, living radical polymerization, cation polymerization, and anion polymerization. The radical and living radical polymerizations are preferred and can be performed in a polymerization process such as solution polymerization, emulsion polymerization, dispersion polymerization, bulk polymerization, etc. A solution polymerization by the radical or living radical polymerization is more preferred since the solution polymerization is easily performed without any necessity for adjusting the molecular weight and refining the raw material. In addition, with the solution polymerization, the monomer is polymerized in a solvent usable in an ink for ink-jet recording, and a resultant dispersant solution as it is and the pigment are dispersed with each other to thereby obtain a liquid (aqueous) pigment dispersion.

The radical polymerization is not particularly limited, and a general azo-based initiator and/or a peroxide-based initiator can be used to perform the polymerization. The azo-based initiator is exemplified by azobisisobutyronitrile, azobisisovaleric acid, etc. The peroxide-based initiator is exemplified by benzoyl peroxide, lauryl peroxide, etc. Further, it is possible to use any chain transfer agent which is exemplified by thiol, alkyl halide, α-methyl styrene dimer, etc. By using the chain transfer agent, the molecular weight can be adjusted to a certain extent. Furthermore, it is possible to use a cobalt-based compound as an irreversible additional cleavage-type chain transfer agent.

The living radical polymerization can take a various kinds of methods, and is not particularly limited. Examples of the living radical polymerization include the NMP (Nitroxide-mediated Polymerization) process using nitroxide, the atom transfer radical polymerization process (ATRP process) utilizing reduction oxidation using a metal complex, the reversible additional cleavage-type chain transfer polymerization process (RAFT process) using dithioester, etc., the TERP process (Tellurium mediated Radical Polymerization process) using organic tellurium, etc., without being particularly limited to these.

Moreover, it is possible to use, as the anion polymerization, the group transfer process using a compound such as ketenesilylacetal, rather than using the living radical polymerization.

An organic solvent usable in the solution polymerization is not particularly limited. It is possible to use one or more kinds of the following substances including: hydrocarbon-based solvents such as toluene, hexane, etc.; alcohol-based solvents such as methanol, isopropanol, etc.; ketone-based solvents such as methyl ethyl ketone, methyl isobutyl ketone, etc.; ester-based solvents such as ethyl acetate, butyl acetate, etc.; ether-based solvents such as tetrahydrofuran, dioxane, etc.; glycol-based solvents such as methoxyethanol, diethylene glycol monobutyl ether, diethylene glycol dimethyl ether, propylene glycol monomethyl ether, propylene glyhcol monomethyl ether acetate, etc.; amide-based solvents such as N-methyl pyrrolidone, dimethyl acetamide, etc.; carbonate-based solvents such as ethylene carbonate, propylene carbonate, etc.; urea-based solvents such as tetramethylurea, dimethyl imidazolidinone, etc.; halogen-base solvents such as dimethylsulfoxide, methylene chloride, etc. Using a glycol-based solvent which is added to the ink for ink-jet recording is particularly preferred because after the solution polymerization is performed, a resultant solution can be used for pigment dispersion as it is. In a case that any other solvent which is not suitable (preferred) for the ink for ink-jet recording is used, it is necessary that the polymer is taken out of the solvent. The method for taking out the polymer is not particularly limited, and may include drying; allowing the polymer to be deposited in a poor solvent; and adding alkaline water after the polymerization to neutralize, thereby to obtain an aqueous solution of the polymer, and then adding an acid to allow the polymer to be deposited, etc.

The polymer obtained in the above-described manner is solubilized to water by neutralizing the acidic group of the polymer. As described above, it is allowable to add an alkaline aqueous solution after the solution polymerization so as to neutralize the acidic group and to perform ionization, thereby obtaining an aqueous solution of the polymer; alternatively, it is allowable to take out the polymer as described above and to mix an alkaline aqueous solution with the taken out polymer so as to dissolve the polymer in the alkaline aqueous solution. In such a manner, it is possible to obtain a pigment dispersant.

A liquid pigment dispersion used in an ink related to the present teaching will be explained. The liquid pigment dispersion related to the present teaching is composed, at least, of: a pigment; a pigment dispersant neutralized by an alkali; and water. Further, there is no particular limitation to the usage of water, and it is possible to use a water-soluble organic solvent or a mixture thereof, as necessary.

The water-soluble organic solvent is not particularly limited, and any water-soluble organic solvent may be used. The water-soluble organic solvent can be exemplified, for example, by: alkyl alcohols having 1 to 4 carbon(s) such as methyl alcohol, ethyl alcohol, n-propyl alcohol, isopropyl alcohol, n-butyl alcohol, sec-butyl alcohol, tert-butyl alcohol, etc.; alkylene glycols in which an alkylene group has 2 to 6 carbon atoms such as ethylene glycol, propylene glycol, butylene glycol, triethylene glycol, 1,2,6-hexanetriol, thiodiglycol, hexylene glycol, diethylene glycol, etc.; glycerol; lower alkyl ethers of alkylene glycols such as ethylene glycol monomethyl (or ethyl, propyl, butyl) ether, diethylene glycol monomethyl (or ethyl, propyl, butyl) ether, triethylene glycol monomethyl (or ethyl, propyl, butyl, hexyl) ether, tetraethylene glycol monomethyl (or ethyl, propyl, butyl, hexyl) ether, propylene glycol monomethyl (or ethyl, propyl, butyl) ether, dipropylene glycol monomethyl (or ethyl, propyl, butyl) ether, tripropylene glycol monomethyl (or ethyl, propyl, butyl) ether, tetrapropylene glycol monomethyl (or ethyl) ether, etc.; N-methyl-2-pyrrolidone; 2-pyrrolidone; 1,3-dimethyl-2-imidazolidinone; etc. Among these substances, it is preferable to use the alkylene glycols and lower alkyl ethers thereof.

Next, the amount of the pigment dispersant relative to the amount of the pigment is not particularly limited, and is in a range of 5 parts by mass to 100 parts by mass relative to 100 parts by mass of the pigment. In a case that the amount of the pigment dispersant is less than 5 parts by mass, the amount of the dispersant is not sufficient, which leads to insufficient dispersibility and stability of the pigment; in a case that the amount of the pigment dispersant is more than 100 parts by mass, there would be any dispersant which does not adsorb to the pigment, which leads to any increased viscosity and/or unsatisfactory discharging stability, and promotes any penetration into paper, resulting in lowered chromogenic property. The amount of the pigment dispersant is more preferably in a range of 10 parts by mass to 50 parts by mass, further more preferably in a range of 20 parts by mass to 45 parts by mass.

The additive amount of water or solvent, etc. can be adjusted depending on the drying property of the ink on a printed matter, the viscosity of the ink, etc.

Further, the concentration of the pigment in the liquid pigment dispersion is arbitrary, and is not particularly limited. Specifically, the pigment concentration is in a range of 5% by mass to 30% by mass, more preferably in a range of 10% by mass to 20% by mass.

Furthermore, a various kinds of additives are used as necessary, but there is no particular limitation to the additive(s). Specifically, it is possible to use, as the additive(s), viscosity-adjusting agents, pH-adjusting agents, fungicides, levelling agents, antifoaming agents, ultraviolet absorbers, light stabilizers, antioxidants, surface tension-adjusting agents, drying preventing agents for nozzle, and further water-insoluble organic solvents, polymer components such as emulsion, surfactants, dyes, etc.

The pigment is dispersed by using the above-described raw materials. The liquid pigment dispersion can be obtained by adding the pigment, the dispersant, liquid medium and additive(s), and by dispersing the pigment by any conventionally known method. Alternatively, it is also possible to process the pigment in advance with the dispersant to obtain a polymer-treated pigment, and then to disperse the treated pigment to thereby obtain the pigment dispersion.

A method for producing the polymer-treated pigment will be explained. Any conventionally known method can be used as the method for obtaining the polymer-treated pigment, and there is no particular limitation to the method. Specific examples of the method include: a method in which a pigment, preferably aqueous paste of pigment is used, to be mixed, in water, with a dispersant neutralized by an alkali and dissolved in water, then an acid is added to allow the polymer to be deposited; a method in which powdery pigment is mixed with a polymer organic solvent which is not neutralized by an alkali, followed by being kneaded by a three-roll mill or a kneader as necessary, and a resultant mixture is added to a poor solvent so as to allow the polymer to be deposited; and the like.

At first, the pigment, the dispersant, and the liquid medium are mixed, and dispersed by a conventionally known method. The dispersion includes a pre-dispersion and a main dispersion. When performing the pre-dispersion, it is possible to use a common dissolver, however, it is also possible to use a high-speed mixer such as homogenizer, etc. As the high-speed mixer, it is preferable to use a T.K. HOMOMIXER (product name), T.K. ROBOMIX (product name), and T.K. FILMIX (product name) manufactured by PRIMIX Corporation; Cleamix (trade name) manufactured by M Technique Co., Ltd.; and Ultra Despa (trade name) manufactured by Asada Iron Works Co., Ltd., etc.

Next, when performing the main dispersion, it is possible to use, other than the kneader, a two-roll mill and the three-roll mill, for example: kneaders such as SS5 (product name; manufactured by M TECHNIQUE CO., LTD.), Miracle KCK (product name; manufactured by ASADA IRON WORKS. CO., LTD.), etc.; ultrasonic dispersion apparatuses; high-pressure homogenizers such as Microfluidizer (product name; manufactured by MIZUHO INDUSTRIAL CO., LTD.); dispersing apparatuses such as Nanomizer (product name; manufactured by YOSHIDA KIKAI CO., LTD.), Star Burst (product name; manufactured by SUGINO MACHINE LIMITED), G-Smasher (product name; manufactured by RIX CORPORATION); and the like. Further, it is also possible to use a ball mill using bead media such as glass and/or zircon, a sand mill, a horizontal media mill dispersing apparatus, a colloid mill, etc.

Further, regarding the polymer-treated pigment, the above-described pre-dispersion and main dispersion are performed by mixing the polymer-treated pigment, the liquid medium and the alkali. In the polymer-treated pigment, the acidic group is not neutralized by the alkali, and thus the alkali is added to neutralize the acidic group in the dispersant so that the acidic group is dispersed in the water.

Furthermore, a method in which the pigment and an organic solvent solution of the polymer which is not neutralized are mixed and kneaded by a three-roll mill, etc., and then the mixture is added with the alkali, followed by removing the organic solvent; or a method in which the pigment, an organic solvent solution of the polymer which is not neutralized and an alkaline aqueous solution are mixed and kneaded, followed by removing the organic solvent may be also used to perform the dispersion in a similar manner; and there is no particular limitation to the method of performing the dispersion. In particular, the above-described methods are suitable for a dispersant of which acid value is small and of which solubility to water is not satisfactory.

Although the obtained liquid pigment dispersion can be used as it is for preparing the water-based ink, it is also preferred that a centrifugal machine, an ultra-centrifugal machine or a filter is used to remove any coarse particles which can be present in a small amount in the liquid pigment dispersion. The coarse particles accumulate as sediments in a water-based pigment ink for ink-jet recording, in some cases. Further, since the coarse particles might cause any clogging of nozzles in ink-jet recording (printing), the content rate of the coarse particles is preferably small.

Regarding the physical property of the obtained liquid pigment dispersion, it is desired that the pigment has a particle diameter in a range of 80 nm to 140 nm, more preferably in a range of 90 nm to 130 nm, in view of the clogging of nozzle during printing. With respect to the physical properties such as the viscosity, surface tension, or pH are not particularly limited, and each may be in any range. Considering the utilization ratio, etc., examples of the range of the viscosity (at 25° C.) include, for example, a range of 1 mPa·s to 100 mPa·s, preferably in a range of 2 mPa·s to 20 mPa·s, etc.; the viscosity (at 25° C.) may be adjusted depending on the required pigment concentration, pigment usage, etc., and is not particularly limited.

The solid content-blending amount (quinacridone ratio) of at least one of the quinacridone and the derivative thereof in the entire amount of the water-based ink is not particularly limited, and can be determined appropriately depending on, for example, a desired chromaticness, etc. The quinacridone ratio is, for example, in a range of 0.1% by weight to 20% by weight, in a range of 1% by weight to 15% by weight, or in a range of 2% by weight to 10% by weight.

Next, the dye represented by the formula (1) will be explained. The dye represented by the formula (1) is capable of realizing the improvement in chromogenic property and the suppression of migration in the water-based ink containing at least one of the quinacridone and the derivative thereof.

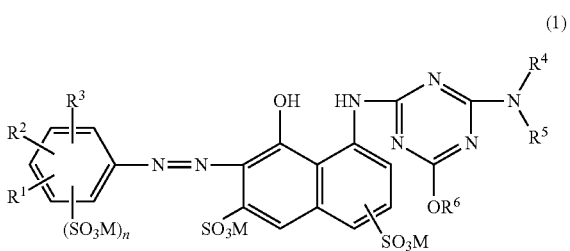

(1)

In the formula (1),
"n" is 0, 1 or 2;
each of $R^1$, $R^2$ and $R^3$ is one selected from the group consisting of: a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, sulfonate group, a substituted or non-substituted alkylsulfonyl group, a substituted or non-substituted arylsulfonyl group, a carboxy group and a carboxylate group;

$R^1$, $R^2$ and $R^3$ may be same as one another or different from one another;

each of $R^4$, $R^5$ and $R^6$ is one selected from the group consisting of: a hydrogen atom, a substituted or non-substituted alkyl group, a substituted or non-substituted alkenyl group, a substituted or non-substituted aryl group, a substituted or non-substituted aralkyl group, a substituted or non-substituted alicyclic group, and a substituted or non-substituted heterocyclic group;

$R^4$, $R^5$ and $R^6$ may be same as one another or different from one another;

each of three Ms is any one of H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$ and $C_2H_4NH_2$, and the three Ms may be same as one another or different from one another.

When any one of $R^1$ to $R^6$ has an acid group, the acid group may be in a salt form, and when any one of $R^1$ to $R^6$ has a plurality of acid groups, a part or all of the acid groups may be in a salt form. Namely, any one of $R^1$ to $R^6$ has an acid group, the acid group may be non-neutralized acid or salt thereof.

In the formula (1), the substituted or non-substituted alkyl group in $R^1$, $R^2$ and $R^3$ is preferably an alkyl group having 1 to 9 carbon atom(s) in total. The substituted or non-substituted alkyl group is exemplified, for example, by methyl group, ethyl group, n-propyl group, isopropyl group, n-butyl group, trifluoromethyl group, dimethylaminomethyl group, etc. The substituent of the substituted alkyl group is exemplified, for example, by hydroxyl group; alkoxy group such as methoxy group, ethoxy group, etc.; cyano group; halogen atom such as fluorine atom, chlorine atom, bromine atom, iodine atom, etc.; and ionic hydrophilic group such as carbonate, sulfonate, etc.; and the like.

In the formula (1), the substituted or non-substituted alkoxy group in $R^1$, $R^2$ and $R^3$ is preferably an alkoxy group having 1 to 9 carbon atom(s) in total. The substituted or non-substituted alkoxy group is exemplified, for example, by methoxy group, isopropoxy group, n-butoxy group, etc.

In the formula (1), the halogen atom in $R^1$, $R^2$ and $R^3$ is exemplified, for example, by fluorine atom, chlorine atom, bromine atom, iodine atom, etc.

In the formula (1), the substituted or non-substituted carbamoyl group in $R^1$, $R^2$ and $R^3$ is exemplified, for example, by carbamoyl group, N—N-dimethylcarbamoyl group, phenylcarbamoyl group etc.

In the formula (1), the substituted or non-substituted sulfamoyl group in $R^1$, $R^2$ and $R^3$ is exemplified, for example, by sulfamoyl group, N-methylsulfamoyl group, N-ethylsulfamoyl group, N-ethyl-N-phenylsulfamoyl group, N,N-dimethylsulfamoyl group, p-carboxyphenylsulfamoyl group, etc.

In the formula (1), the substituted or non-substituted amino group in $R^1$, $R^2$ and $R^3$ is exemplified, for example, by N-methylamino group, carbamoylamino group, N,N-diethylamino group, acetylamino group, etc.

In the formula (1), the sulfonate group (sulfonic acid ester group) in $R^1$, $R^2$ and $R^3$ is exemplified, for example, by phenoxysulfonyl group, etc.

In the formula (1), the substituted or non-substituted alkylsulfonyl group in $R^1$, $R^2$ and $R^3$ is preferably an alkylsulfonyl group having 1 to 9 carbon atom(s) in total. The substituted or non-substituted alkylsulfonyl group is exemplified, for example, by hydroxysulfonyl group, etc.

In the formula (1), the substituted or non-substituted arylsulfonyl group in $R^1$, $R^2$ and $R^3$ is preferably an arylsulfonyl group having 6 to 15 carbon atoms in total. The substituted or non-substituted arylsulfonyl group is exemplified, for example, by benzylsulfonyl group, etc.

In the formula (1), the carboxylic acid ester group in $R^1$, $R^2$ and $R^3$ is exemplified, for example, by methoxycaronyl group, etc.

In the formula (1), the substituted or non-substituted alkyl group in $R^4$, $R^5$ and $R^6$ is preferably an alkyl group having 1 to 18 carbon atom(s) in total. The substituted or non-substituted alkyl group is exemplified, for example, by ethyl group, n-butyl group, n-octyl group, ethylhexyl group, hydroxyethyl group, carboxypropryl group, carboxycyclohexylmethyl group, 1-carboxy-2-mercapto-ethyl group, 1-carboxy-2-carbamoyl-ethyl group, 1-isopropyl-1-carboxymethyl group, 1,2-dicarboxypropyl group, etc. The substituent of the substituted alkyl group is exemplified, for example, by hydroxyl group; alkoxy group such as methoxy group, ethoxy group, etc.; cyano group; halogen atom such as fluorine atom, chlorine atom, bromine atom, iodine atom, etc.; and ionic hydrophilic group such as carbonate, sulfonate, etc.; and the like.

In the formula (1), the substituted or non-substituted alkenyl group in $R^4$, $R^5$ and $R^6$ is preferably an alkenyl group having 2 to 18 carbon atoms in total. The substituted or non-substituted alkenyl group is exemplified, for example, by 2-methyl-1-propenyl group, vinyl group, allyl group, etc.

In the formula (1), the substituted or non-substituted aryl group in $R^4$, $R^5$ and $R^6$ is exemplified, for example, by 3,4-dicarboxyphenyl group, 4-butylphenyl group, 4-carboxyphenyl group, etc. The substituent of the substituted aryl group is exemplified, for example, by those same as the above-described exemplified substituents for the substituted alkyl group.

In the formula (1), the substituted or non-substituted aralkyl group in $R^4$, $R^5$ and $R^6$ is exemplified, for example, by benzyl group, 1-carboxy-2-phenyl-ethyl group, 1-carboxy-2-hydroxyphenylethyl group, 4-carboxybenzyl group, etc.

In the formula (1), the substituted or non-substituted alicyclic group in $R^4$, $R^5$ and $R^6$ is exemplified, for example, by cyclohexyl group, 4-carboxycyclohexyl group, etc.

In the formula (1), the substituted or non-substituted heterocyclic group in $R^4$, $R^5$ and $R^6$ is exemplified, for example, by pyridyl group, thiadiazolyl group, benzothiazolyl group, 2,2,6,6-tetramethylpiperidinyl group, etc. The substituent of the substituted heterocyclic group is exemplified, for example, by those same as the above-described exemplified substituents for the substituted alkyl group.

In the formula (1), at least one of $R^4$, $R^5$ and $R^6$ may be an alkyl group, alkenyl group, aryl group, alicyclic group, aralkyl group or heterocyclic group which is substituted by one to four pieces of carboxy group(s) or sulfamoyl group(s).

In the formula (1), each of $R^4$ and $R^5$ may be a hydrogen atom or a tri-substituted phenyl group, and $R^4$ and $R^5$ may be identical to or different from each other. Here, each of three substituents of the tri-substituted phenyl group is one group selected from the group consisting of: a hydrogen atom, a halogen atom, a hydroxyl group, a substituted or non-substituted alkyl group having 1 to 9 carbon atom(s) in total, a substituted or non-substituted alkoxy group having 1 to 9 carbon atom(s) in total, a substituted or non-substituted carbamoyl group, a substituted or non-substituted sulfamoyl group, a substituted or non-substituted amino group, a nitro group, a sulfonate group, or a carboxylate group. The aforementioned three substituents may be identical to or different from one another.

A preferred aspect of the dye represented by the formula (1) is exemplified, for example, by an aspect wherein in the formula (1), at least one of $R^4$, $R^5$ and $R^6$ is an alkyl group, an alkenyl group, an aryl group, an aralkyl group, or a cyclohexyl group substituted by one to four pieces of carboxy group(s) or sulfamoyl group(s).

With respect to the dye represented by the formula (1), the number of sulfonic group, carboxy group, or the salt thereof contained in its structure is preferably six or less in total, more preferably five or less in total, and much more preferably four or less in total.

Another preferred aspect of the dye represented by the formula (1) is exemplified, for example, by an aspect wherein in the formula (1):

n is 0;

$R^1$ is a carboxy group, a carbamoyl group, a trifluoromethyl group, or a sulfamoyl group;

$R^2$, $R^3$ and $R^5$ each are a hydrogen atom;

$R^4$ is a phenyl group optionally substituted by a carboxy group or a sulfamoyl group, or a carboxy alkyl group;

$R^6$ is a hydrogen atom or an alkyl group;

when any one of $R^1$ to $R^6$ has an acid group, the acid group may be in a salt form, and when any one of $R^1$ to $R^6$ has a plurality of acid groups, a part or all of the acid groups may be in a salt form; and each of three Ms is any one of H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$ and $C_2H_4NH_2$, and the three Ms may be same as one another or different from one another.

Preferred specific examples of the dye represented by the formula (1) include compounds represented by the following formulae (1-1) to (1-5).

(1-1)

The compound represented by the formula (1-1) is an aspect wherein in the formula (1), n is 0;

$R^1$ is a carboxy group at the 2-position of a phenyl group bonded to an azo group;

$R^2$, $R^3$ and $R^5$ each are a hydrogen atom;

$R^4$ is a 2-carboxyphenyl group;

$R^6$ is a hydrogen atom; and

M is $NH_4$.

(1-2)

The compound represented by the formula (1-2) is an aspect wherein in the formula (1), n is 0;

$R^1$ is a carbamoyl group at the 2-position of a phenyl group bonded to an azo group;

$R^2$, $R^3$ and $R^5$ each are a hydrogen atom;

$R^4$ is a 2-carboxyphenyl group;

$R^6$ is a hydrogen atom; and

M is Na.

(1-3)

The compound represented by the formula (1-3) is an aspect wherein in the formula (1), n is 0;

$R^1$ is a sulfamoyl group at the 3-position of a phenyl group bonded to an azo group;

$R^2$, $R^3$ and $R^5$ each are a hydrogen atom;

$R^4$ is a 2-sulfamoylphenyl group;

$R^6$ is an isopropyl group; and

M is $NH_3C_2H_5$.

(1-4)

The compound represented by the formula (1-4) is an aspect wherein in the formula (1), n is 0;

$R^1$ is a trifluoromethyl group at the 2-position of a phenyl group bonded to an azo group;

$R^2$, $R^3$ and $R^5$ each are a hydrogen atom;

$R^4$ is a 1-carboxy-2-methylbutyl group;

$R^6$ is a methyl group; and

M is $NH_3CH_3$.

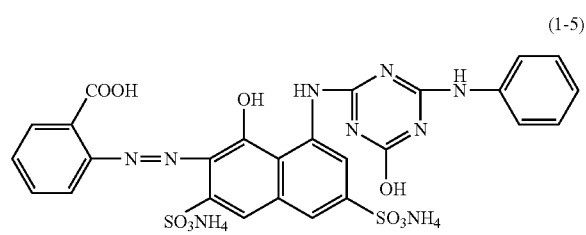

(1-5)

The compound represented by the formula (1-5) is an aspect wherein in the formula (1), n is 0;

$R^1$ is a carboxy group at the 2-position of a phenyl group bonded to an azo group;

$R^2$, $R^3$ and $R^5$ each are a hydrogen atom;

$R^4$ is a phenyl group;

$R^6$ is a hydrogen atom; and

M is $NH_4$.

The dye represented by the formula (1) can be produced, for example, by a method as disclosed in Japanese Patent Application Laid-open No. HEI08-73791 corresponding to the U.S. Pat. No. 5,599,386.

The blending amount of the dye represented by the formula (1) in the water-based ink (dye ratio) is, for example, in a range of 0.2% by weight to 2.5% by weight, in a range of 0.3% by weight to 1.9% by weight, or in a range of 0.5% by weight to 1.5% by weight. In a case that the blending amount of the dye represented by the formula (1) is within the above-described range, it is possible to obtain a recorded matter excellent in the chromogenic property and the water resistance.

In the water-based ink, weight ratio (D/P) of to the dye (D) represented by the formula (1) to at least one (P) of the quinacridone and the derivative thereof is in a range of D/P=0.03 to 0.7, 0.05 to 0.6 or 0.08 to 0.4. In a case that the ratio (D/P) is within the above-described range, it is possible to obtain a recorded matter which is excellent in the chromogenic property and in which the migration is suppressed.

In the water-based ink, the weight ratio D/P is preferably in the range of 0.08 to 0.4, and the dye ratio is preferably in the range of 0.5% by weight to 1.5% by weight. In a case that the blending amount of the dye represented by the formula (1) and the ratio (D/P) are within the above-described ranges, respectively, it is possible to obtain a recorded matter which is excellent in the chromogenic property and the water resistance, and in which the migration is suppressed.

It is allowable that the water-based ink further contains, in addition to at least one of the quinacridone and the derivative thereof and the dye represented by the formula (1), another pigment and dye, etc., or that the water-based ink does not further contain another pigment and dye, etc. In view of realizing both of the improvement in chromogenic property and the suppression of migration, main constituents (main components) of the colorant are preferably at least one of the quinacridone and the derivative thereof, and the dye represented by the formula (1). The ratio of the total of the blending amount of at least one of the quinacridone and the derivative thereof and the blending amount of the dye represented by the formula (1), relative to the entire amount of the colorant in the water-based ink is, for example, in a range of 80% by weight to 100% by weight, preferably in a range of 90% by weight to 100% by weight.

As described above, in view of the storing stability of the water-based ink, at least one of the quinacridone and the derivative thereof is preferably dispersed in water by the pigment dispersant, and the pigment dispersant is preferably a resin for dispersing pigment (pigment-dispersing resin) which contains an ethylene oxide chain. Further, in a case that the water-based ink contains the pigment-dispersing resin containing the ethylene oxide chain, it is expected that the effect of suppressing migration can be obtained. It is presumed that the pigment-dispersing resin containing the ethylene oxide chain interacts with the dye represented by the formula (1) to thereby suppress any bleeding (seeping) of the dye represented by the formula (1) to a periphery (fringe, edge or circumferential) portion of a recorded portion. In view of suppressing the migration, the weight ratio (RID) of the blending amount (R) of the pigment-dispersing resin containing the ethylene oxide chain in the water-based ink relative to the blending amount (D) of the dye represented by the formula (1) in the water-based ink is, for example, not less than 0.3, preferably not less than 0.5.

The water is preferably ion-exchange water or purified water (pure water). The blending amount of the water with respect to the entire amount of the water-based ink (water ratio) is, for example, in a range of 10% by weight to 90% by weight, preferably in a range of 40% by weight to 80% by weight. The blending amount of the water also may be, for example, a balance of the other components.

The water-based ink may further contain a humectant. For example, the humectant prevents the water-based ink from drying at an end (tip) portion of a nozzle in an ink-jet head. Further, the water-based ink may contain a humectant of which vapor pressure is not more than 0.002 mmHg. The humectant of which vapor pressure is not more than 0.002 mmHg has a high moisture-retention property, and thus is highly effective in preventing the water-based ink from drying at an end portion of the nozzle portion of an ink-jet head. The humectant of which vapor pressure is not more than 0.002 mmHg easily remains on the recording medium, however, and thus there is such a fear that the humectant might promote the migration. The blending amount of the humectant in the entire amount of the water-based ink is preferably not more than 25% by weight, more preferably not more than 20% by weight. By making the blending amount of the humectant to be not more than 25% by weight, the migration can be suppressed. On the other hand, in view of preventing the water-based ink from drying at the end portion of the nozzle in the ink-jet head, the blending amount of the humectant in the entire amount of the water-based ink is preferably not less than 5% by weight, more preferably not less than 10% by weight. The humectant is exemplified, for example, by glycerol, triethylene glycol, tetraethylene glycol, polyethylene glycol, 1,6-hexanediol, etc. Among the above-described substances, glycerol and triethylene glycol are preferred, and the glycerol is more preferred.

It is allowable that the water-based ink further contains a humectant of which vapor pressure exceeds 0.002 mmHg; alternatively, it is allowable that the water-based ink does not further contain the humectant of which vapor pressure exceeds 0.002 mmHg. The humectant of which vapor pressure exceeds 0.002 mmHg is excellent from the viewpoint that the humectant of which vapor pressure exceeds 0.002 mmHg does not promote migration as compared with the humectant of which vapor pressure is not more than 0.002 mmHg.

The humectant of which vapor pressure exceeds 0.002 mmHg is not particularly limited, and is exemplified, for example, by lower alcohols such as methyl alcohol, ethyl alcohol, n-propyl alcohol, isopropyl alcohol, n-butyl alcohol, sec-butyl alcohol, tert-butyl alcohol, etc.; amides such as dimethylformamide, dimethylacetamide, etc.; ketones such as acetone, etc.; ketoalcohols such as diacetone alcohol, etc.; ethers such as tetrahydrofuran, dioxane, etc.; polyethers such as polyalkylene glycol, etc.; polyalcohols such as alkylene glycol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polypropylene glycol, and the like. The alkylene glycol is exemplified, for example, by ethylene glycol, propylene glycol, butylene glycol, diethylene glycol, dipropylene glycol, tripropylene glycol, thiodiglycol, hexylene glycol, 1,2-hexanediol, etc. These humectants may be used alone or in a combination of two or more of the humectants. Among these humectants, polyalcohol such as alkylene glycol, etc., is preferred.

The blending amount of the humectant of which vapor pressure exceeds 0.002 mmHg in the entire amount of the water-based ink is, for example, in a range of 0% by weight to 95% by weight, a range of 5% by weight to 80% by weight, or a range of 5% by weight to 50% by weight.

The water-based ink may further contain a penetrant. The penetrant adjusts, for example, a drying rate of the water-based ink on a recording medium. The penetrant is exemplified, for example, by glycol ethers, etc. The glycol ethers are exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. Among the above-described substances, triethylene glycol-n-butyl ether is preferred as the penetrant. The penetrants may be used alone or in a combination of two or more of the penetrants.

The blending amount of the penetrant in the entire amount of the water-based ink is, for example, in a range of 0% by weight to 20% by weight, in a range of 0% by weight to 15% by weight, or in a range of 1% by weight to 4% by weight.

The water-base ink may further contain an anionic surfactant. The anionic surfactant is exemplified, for example, by alkyl sulfuric acid salt, alkyl ester sulfuric acid salt, alkyl ether sulfuric acid salt, alkylbenzene sulfonate, alkyl phosphate, α-olefin sulfonate sodium salt (sodium α-olefin sulfonate), sulfosuccinic acid, etc. As the anionic surfactant, a commercially available product may be used. The commercially available product is exemplified, for example, by anionic surfactants produced by LION SPECIALTY CHEMICALS CO., LTD., including "LIPOLAN (trade name)" series, "LIPON (trade name)" series, "SUNNOL (trade name)" series, "LIPOTAC (trade name) series, ENAGICOL (trade name)" series, "LIPAL (trade name)" series, and "LOTAT (trade name)" series, etc.; anionic surfactants produced by KAO CORPORATION including "EMAL (trade name)" series, "LATEMUL (trade name)" series, "VENOL (trade name) series, "NEOPELEX (trade name)" series, NS SOAP, KS SOAP, OS SOAP, and "PELEX (trade name)" series, etc.; anionic surfactants produced by SANYO CHEMICAL INDUSTRIES, LTD. including "SANDET (trade name)" series and "BEAU-LIGHT (trade name)" series, etc.; anionic surfactants produced by TOHO CHEMICAL INDUSTRY CO., LTD. including "ALSCOPE (trade name)" series, "NEOSCOPE (trade name)" series, "PHOSFANOL (trade name)" series, etc.; sodium hexadecyl sulfate, sodium stearyl sulfate, etc. produced by TOKYO CHEMICAL INDUSTRY CO., LTD.; and the like.

The blending amount of the anionic surfactant in the entire amount of the water-based ink is, for example, not more than 5% by weight, not more than 3% by weight, or in a range of 0.1% by weight to 2% by weight.

The water-base ink may further contain a nonionic surfactant. As the nonionic surfactant, it is allowable to use a commercially available product. The commercial available product is exemplified, for example, by "OLFIN (trade name) E1010", "OLFIN (trade name) E1006", "OLFIN (trade name) E1004", etc., produced by NISSHIN KAGAKU KOGYO KK, etc.

The blending amount of the nonionic surfactant in the entire amount of the water-based ink is, for example, not more than 5% by weight, not more than 3% by weight, or in a range of 0.1% by weight to 2% by weight.

The water-based ink may further contain any known additive, as necessary. The additive is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The water-based ink can be prepared, for example, by uniformly mixing at least one of the quinacridone and the derivative thereof, the dye represented by the formula (1), water, and optionally other additive(s) as necessary, by a conventionally known method, and then removing any non-dissolved matter, etc., with a filter, etc. Note that the above-described method for preparing the water-based ink may include the above-described step for preparing the liquid pigment dispersion. Namely, it is allowable that at first, a liquid pigment dispersion in which at least one of the quinacridone and the derivative thereof is dispersed with a pigment dispersant is prepared, and then the prepared liquid pigment dispersion, the dye represented by the formula (1) and the water, and optionally other additive(s) as necessary, are mixed by a conventionally known method, to thereby prepare a water-based ink.

As explained above, since the water-based ink for ink-jet recording related to the present teaching contains at least one of the quinacridone and the derivative thereof, and the dye represented by the formula (1), the water-based ink related to the present teaching is capable of realizing both of the improvement in chromogenic property and the suppression of migration.

Next, an ink cartridge related to the present teaching is characterized by being an ink cartridge containing a water-based ink for ink-jet recording; wherein the water-based ink is the water-based ink for ink-jet recording related to the present teaching. For example, any conventionally known main body (body) of an ink cartridge can be used as the main body of the ink cartridge related to the present teaching.

Next, explanation will be given about an ink-jet recording apparatus and an ink-jet recording method related to the present teaching.

The ink-jet recording apparatus related to the present teaching is an ink-jet recording apparatus characterized by including: an ink accommodating section configured to accommodate an ink therein; and an ink discharge mechanism configured to discharge the ink accommodated in the ink accommodating section; wherein the ink accommodated in the ink accommodating section is the water-based ink related to the present teaching.

The ink-jet recording method related to the present teaching is an ink-jet recording method characterized by including: performing recording on a recording medium by discharging, to the recording medium, a water-based ink by an ink-jet system; and using the water-based ink for ink-jet recording related to the present teaching, as the water-based ink.

The ink-jet recording method related to the present teaching can be practiced, for example, by using the ink-jet recording apparatus related to the present teaching. The recording includes printing a letter (text), printing an image, printing, etc.

Figure 2:
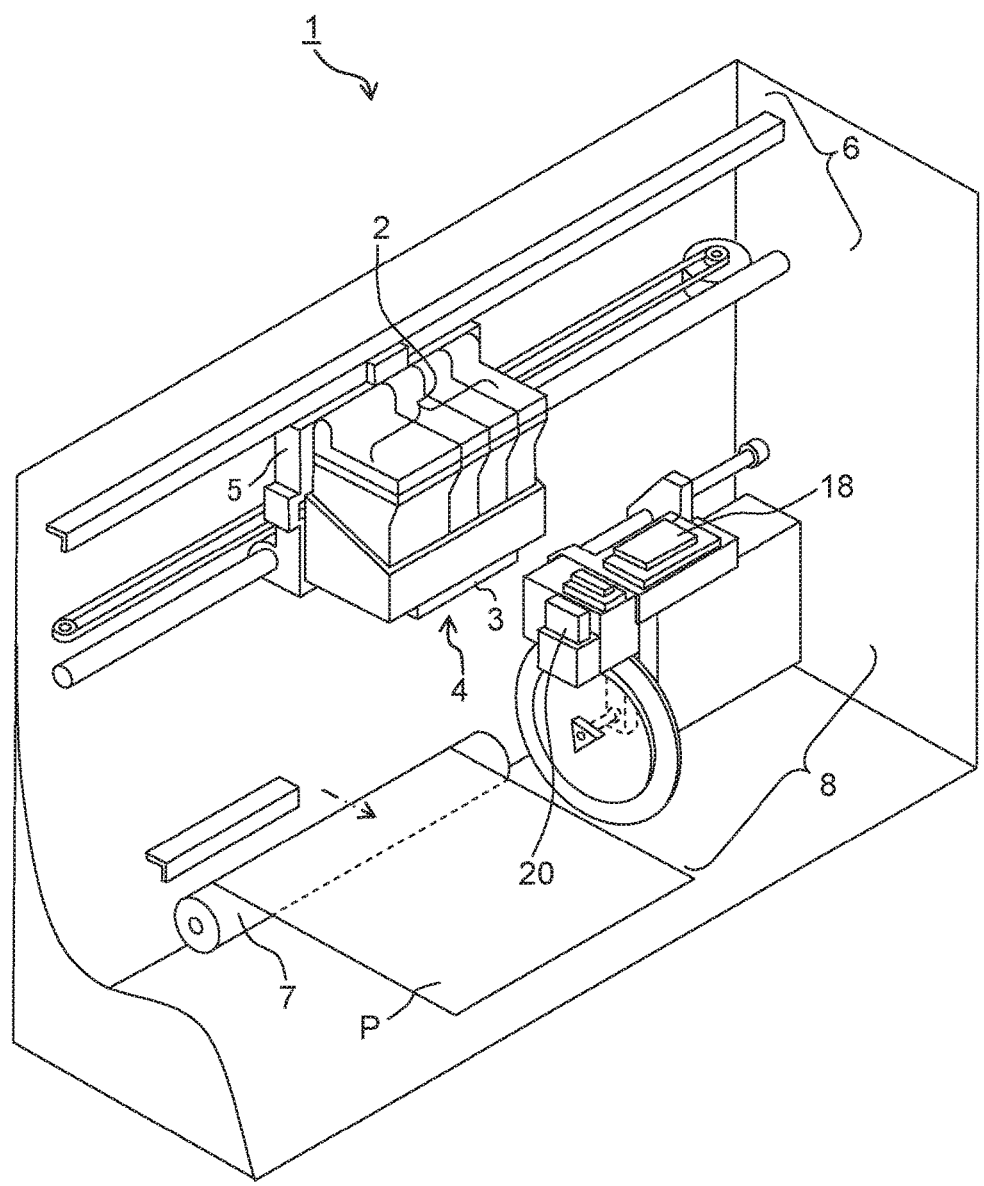
FIG. 2 is a perspective view schematically illustrating the configuration of an example of an ink-jet recording apparatus related to the present teaching.

FIG. 2 depicts the configuration of an example of the ink-jet recording apparatus related to the present teaching. As depicted in FIG. 2, an ink-jet recording apparatus 1 related to the present teaching includes four ink cartridges 2, an ink discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks, respectively, the four colors being yellow, magenta, cyan and black. At least one water-based ink among the four color water-based inks is the water-based ink for ink-jet recording related to the present teaching. The ink-jet head 3 disposed on the head unit 4 performs recording on a recording medium (for example, recording paper or recording sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the inside of the ink-jet head 3. As the purge device 8, it is possible to use, for example, a conventionally known purge device (see, for example, Japanese Patent Application laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 2, a cap 18 is provided to cover a plurality of nozzles of the ink-jet head 3 which is returned to a reset position upon completion of the recording, so as to prevent the water-based inks from drying.

In the ink-jet recording apparatus 1 of the present embodiment, the four ink cartridges 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, each of the four ink cartridges 2 and the head unit 4 which is provided on the carriage 5 are connected with a tube, etc., and the water-based inks are supplied from the four cartridges 2, respectively, to the head unit 4 via the tubes.

Ink-jet recording using the ink-jet recording apparatus 1 is performed, for example, in the following manner. Namely, at first, a recording paper P is supplied or fed, for example, from a paper feeding cassette or sheet feeding cassette (not depicted in the drawing) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. The recording paper P after the recording is discharged from the ink-jet recording apparatus 1. According to the present teaching, it is possible to obtain a recorded matter which has an excellent chromogenic property and in which the migration is suppressed. In FIG. 2, the paper feeding mechanism and paper discharge mechanism for the recording paper P are omitted in the drawing.

In the apparatus depicted in FIG. 2, an ink-jet head of serial type (serial type ink-jet head) is adopted. However, the present teaching is not limited to this. The ink-jet recording apparatus may be an apparatus adopting an ink-jet head of line type (line type ink-jet head).

EXAMPLES

Next, examples related to the present teaching will be explained together with comparative examples. Note that the present teaching is not limited and is not restricted to the examples and the comparative examples which will be described below.

[Preparation Example 1] Preparation of Liquid (Aqueous) Dispersion of Water-Based Pigment of Magenta Color 200 parts of C.I. Pigment Red 122 as a magenta pigment; 175 parts of an aqueous solution of a neutralized product (solid content: 40%) of copolymer of styrene/methyl methacrylate/methacrylic acid 2-ethylhexyl/polyethylene glycol monomethacrylate (molecular weight: 350)/methacrylic acid (mass ratios: 20/20/20/20/20; number-average molecular weight: 13000) neutralized by potassium hydroxide, as a pigment dispersant 1; and 425 parts of water as a liquid medium were blended, deflocculated (peptized) with a dispersing apparatus, and thus a pre-mill base was prepared. Then, the pre-mill base was subjected to a dispersing process with a horizontal media mill dispersing apparatus "Dyno-Mill 0.6 Liter ECM Type" (product name; manufactured by SHINMARU ENTERPRISES CORPORATION; diameter of zirconia beads: 0.5 mm), at a peripheral speed of 10 m/s. After performing the dispersion for 2 hours, the dispersion was ended, and thus a mill base was obtained.

The obtained mill base was diluted by an ion-exchange water so that the pigment content was 15% by weight, followed by subjected to centrifugation; a resultant liquid pigment dispersion was filtrated through a membrane filter (pore size: 10 μm), then the ion-exchange water, an antiseptic agent and glycerol were added each in a predetermined amount to the filtered liquid pigment dispersion, and thus a liquid magenta-color pigment dispersion of which pigment concentration was 12% by weight was obtained.

The average particle diameter of the liquid pigment dispersion was measured (at 25° C.) by a particle size measuring apparatus "NICOMP 380ZLS-S" (product name; manufactured by Particle Sizing Systems PSS), and the average particle size was 123 nm. In the liquid pigment dispersion, the viscosity was 4.96 mPa·s (at 25° C.), the surface tension was 46.5 mN/m (at 25° C.), and the pH was 9.4 (at 25° C.). The composition and the results of physical properties of the liquid pigment dispersant are indicated in TABLE 1 below.

TABLE 1

|  |  | Preparation Example 1 |
|---|---|---|
| Liquid pigment dispersion |  | Liquid pigment dispersion of magenta color |
| Pre-Mill Base | Pigment used | 200 parts of C.I. Pigment Red 122 |
|  | Dispersant used | Pigment dispersant 1 |
|  | Acid value of dispersant (mgKOH/g) | 130 |
|  | Amount of dispersant | 175 parts |
|  | Water | 425 parts |
| Physical Properties | Average particle diameter (nm) | 123 |
|  | Viscosity (mPa · s) | 4.96 |
|  | Surface tension (mN/m) | 46.5 |
|  | pH | 9.4 |

As a storing stability test, TABLE 2 below indicates the changes in particle diameter and viscosity after the liquid dispersion of water-based pigment of magenta color was allowed to stand still at 70° C. for one week. As the stability, the rate of change (%) in each of the particle diameter and the viscosity in a case that the liquid dispersion of the water-based magenta pigment was allowed to stand still at 70° C. for seven days. The rate of change is indicated as the percentage (%) of (value measured after 7 days)/(initial value)−1. In the liquid dispersion of water-based pigment (of magenta color), no changes were observed both in the particle diameter and the viscosity, and the storing stability was satisfactory.

TABLE 2

| | Average Particle Diameter (nm) | | | | Viscosity (mPa · s) | | | |
|---|---|---|---|---|---|---|---|---|
| | Initial state | After 7 days | Rate of change | Evaluation | Initial state | After 7 days | Rate of change | Evaluation |
| Preparation Example 1 | 123 | 123 | 0% | A | 4.96 | 4.88 | −2% | A |

<Evaluation Criterion>
The evaluation was made based on the following evaluation criterion.
(Changes in the Particle Diameter and Viscosity)
A: The rate of change was less than ±5%.
B: The rate of change was in a range of not less than ±5% to less than 10%. C: The rate of change was not less than ±10%.

Examples 1-1 to 1-3

Examples 1-1 to 1-3 are examples in each of which the blending amount(s) of at least one of the quinacridone and the derivative thereof was (were) changed. Components, except for the liquid pigment dispersion 1, which were included in Water-based Ink Composition (TABLE 3) as indicated below were mixed uniformly or homogeneously; and thus an ink solvent was obtained. Subsequently, the ink solvent was added to the liquid pigment dispersant 1, followed by being mixed uniformly. After that, the obtained mixture was filtrated through a cellulose acetate membrane filter (pore size 3.00 µm) produced by TOYO ROSHI KAISHA, LTD., and thus a water-based ink for ink-jet recording of each of Examples 1-1 to 1-3 was obtained. Note that in TABLE 3, a dye (1-1) indicates a compound represented by the formula (1-1), and this is similarly applied in TABLE 4 and thereafter (as will be described later on). Note that in TABLE 3, the liquid pigment dispersion 1 is the liquid dispersion of water-based pigment of magenta color prepared in Preparation Example 1 as described above (pigment concentration: 12% by weight). This is applicable similarly to TABLE 4 and thereafter. Note that in TABLE 3, a blending amount (% by weight) of glycerol indicates a total amount of glycerol in a water-based ink including glycerol contained in the liquid pigment dispersion 1, and this is similarly applied in TABLE 4 and thereafter.

With respect to the water-based inks of Examples 1-1 to 1-3, (a) evaluation of migration, (b) evaluation of chromogenic property (chromaticness, color), (c) evaluation of chromogenic property (hue angle), (d) evaluation of storing stability, and (e) evaluation of water resistance were performed by the following methods.

(a) Evaluation of Migration

Fifteen patches were recorded by discharging the water-based ink for ink-jet recording of each of Examples 1-1 to 1-3 onto a recording medium (glossy paper "BP71GA4" manufactured by BROTHER KOGYO KABUSHIKI KAISHA) as shown in FIG. 1 in a high temperature and high humidity environment (temperature: 33° C., relative humidity: 80%) to thereby prepare evaluation samples. Each of the fifteen patches was subjected to the above recording so that a slit (non-recorded portion) was provided along a direction of movement of the carriage of the ink-jet recording apparatus shown in FIG. 2 described above so as to divide a solid image (single color patch) (300% duty at a resolution of 1200 dpi×2400 dpi) into two portions. The solid image of 300% duty can be recorded, for example, in the following manner: namely, three ink cartridges (ink cartridges for the water-based yellow ink, the water-based magenta ink, and the water-based cyan ink) among the four ink cartridges of the ink-jet recording apparatus shown in FIG. 2 described above are replaced with the ink cartridges which are filled with an identical water-based ink, and the identical water-based ink, with which the three ink cartridges are filled, is discharged in the same scanning under a condition in which 100% duty is provided respectively. In the fifteen patches, the widths of the slits are 2, 4, 6, 8, 10, 12, 14, 16, 18, 20, 22, 24, 26, 28, and 30 dots respectively. In this case, the term "one dot" means a dot which is provided at a resolution of 1200 dpi×1200 dpi, and which corresponds to 1/1200 inch (2.54/1200 cm). Subsequently, the evaluation samples were stored for 3 days in the above-described high temperature and high humidity environment. Subsequently, measurement was made as to whether or not the slit was judged to be a white background line by using a handy type image evaluation system "PIAS (trade name)-II" produced by QUALITY ENGINEERING ASSOCIATES (QEA). Specifically, the slit is arranged at the center of a screen of the image evaluation system. If the slit were judged to be a continuous white background line from the left end to the right end of the screen under the following measurement condition, it was assumed that the evaluation sample was acceptable (succeeds in the examination). The judgment was progressively performed as starting from a patch having a narrow slit width among the 15 patches to determine a slit width at which the evaluation samples became acceptable (succeeds in the examination) firstly. Based on the slit width, the migration (migration level) of the water-based ink was determined in accordance with the following evaluation criterion.

<Measurement Condition for Migration Level>
Measurement tool: "Line analysis" or "Edge analysis";
Edge boundary line threshold value: 75% (the slit was judged not to be a continuous white background line if a portion, in which $\{R/(R_{max}-R_{min})\}\times 100 \leq 75$ holds, was present in the screen of the image evaluation system, assuming that $R_{max}$ represents the maximum value of the reflectance measured value for the slit portion, $R_{min}$ represents the minimum value of the reflectance measured value for the solid recorded portion of the patch, and R represents the reflectance measured value for the slit portion);
Color Plane: Auto;
Orientation: horizontal line;
Background (Polarity): dark (Light on dark).
<Evaluation Criterion for Migration Level>
A: firstly accepted at a patch having slit width of not more than 6 dots;
B: firstly accepted at a patch having slit width of 8 dots or 10 dots; and
C: firstly accepted at a patch having slit width of not less than 12 dots.

(B) Evaluation of Chromogenic Property (Chromaticness)

An ink-jet printer "MFC-J4510N" manufactured by BROTHER KOGYO KABUSHIKI KAISHA was used to record a solid image (single color patch) on a plain paper (plain paper "4200" produced by XEROX CORPORATION), under the conditions with a resolution of 600 dpi× 300 dpi, by using each of the water-based inks of Examples 1-1 to 1-3. Thus, evaluation samples were produced. The chromaticness (C*) of the solid image of each evaluation sample was measured by using a spectrophotometric colorimetry meter "SpectroEye" (field: 2'; reference white: Abs; light source: D50; density reference: ANSI T) manufactured by GRETAG MACBETH, and evaluations were made for the solid image of each of the evaluation samples based on the following evaluation criterion.

<Evaluation Criterion for Evaluation of Chromogenic Property (Chromaticness)>
A: C* was not less than 50;
B: C* was in a range of not less than 48 to less than 50; and
C: C* was less than 48.

(c) Evaluation of Chromogenic Property (Hue Angle)

The hue angle (h) of the recorded solid image of each of the evaluation samples was measured by using spectrophotometric colorimetry meter "SpectroEye" (field: 2'; reference white: Abs; light source: D50; density reference: ANSI T) manufactured by GRETAG MACBETH, in a similar manner as in the above-described (b) evaluation of the chromogenic property (chromaticness), and evaluations were made for the solid image of each of the evaluation samples based on the following evaluation criterion.

<Evaluation Criterion for Evaluation of Chromogenic Property (Hue Angle)>
A: h was in a range of not less than 340° to less than 360';
B: h was in a range of not less 335° to less than 340°, or in a range of not less than 0° to less than 10°; and
C: h was in a range of not less than 10° to less than 335°.

(d) Evaluation of Storing Stability

An absorbance at a wavelength of maximum absorption peak of a diluent, which was obtained by diluting 1600 times each of the water-based inks of Examples 1-1 to 1-3 with pure water, was measured using an UV-VIS-NIR spectrophotometer UV 3600 manufactured by SHIMADZU CORPORATION. A measuring cell having a cell length of 10 mm was used for the measurement of the absorbance. Then, the water-based inks of Examples 1-1 to 1-3 were poured in airtight containers, respectively, and the airtight containers were stored for 2 weeks at 60° C. An absorbance of a diluent that was obtained by diluting, with pure water, 1600 times each of the water-based inks of Examples 1-1 to 1-3 after the storage was measured in the same manner as that before the storage. Then, an absorbance decrease rate (%) was determined based on the following equation (I), and storing stability of the water-based ink was evaluated according to the following evaluation criterion. Note that the storing stability was considered to be superior as the absorbance decrease rate was small.

$$\text{Absorbance decrease rate (\%)}=\{(X-Y)/X\}\times 100 \qquad (I)$$

X: Absorbance before storage
Y: Absorbance after storage
<Criterion for Evaluation of Storing Stability>
A: The absorbance decrease rate was less than 5%.
B: The absorbance decrease rate was in a range of not less than 5% to less than 10%.
C: The absorbance decrease rate was not less than 10%.

(e) Evaluation of Water Resistance

The optical density (OD value) of a solid image (single color patch) of each of evaluation samples, recorded in a similar manner as that in the evaluation of the above-described item (b): chromogenic property (chromaticness) by using the water-based inks of Examples 1-1 to 1-3 respectively, was measured by using the spectrophotometric colorimetry meter "SpectroEye" (field: 2°; reference white: Abs; light source: D50; density reference: ANSI T) manufactured by GRETAG MACBETH. Then, when one day elapsed after the recording, the recorded solid images of the respective evaluation samples were immersed in water for 5 minutes, followed by being dried sufficiently, and then the optical density (OD value) of each of the solid images was measured again. Next, the OD value decrease rate (%) was determined according to the following equation (II), and the water resistance as the water-based ink was evaluated according to the following evaluation criterion.

$$\text{OD value decrease rate (\%)}=\{(X-Y)/X\}\times 100 \qquad (II)$$

X: OD value before immersion in water
Y: OD value after immersion in water
<Criterion for Evaluation of Water Resistance>
A: The OD value decrease rate was less than 20%.
B: The OD value decrease rate was in a range of not less than 20% to less than 40%.
C: The OD value decrease rate was not less than 40%.

The water-based ink compositions and the evaluation results of the water-based inks of Examples 1-1 to 1-3 are indicated in TABLE 3 below.

TABLE 3

|  |  |  | EXAMPLES | | |
|---|---|---|---|---|---|
|  |  |  | 1-1 | 1-2 | 1-3 |
| Water-based Ink Composition (% by weight) | Liquid pigment dispersion 1 (*1) |  | 37.50 (4.5) | 42.00 (3.5) | 72.00 (6.0) |
|  | Dye (1-1) |  | 1.0 | 1.0 | 1.0 |
|  |  | Vapor Pressure (mmHg) |  |  |  |
|  | Glycerol | <0.001 | 18.0 | 18.0 | 18.0 |
|  | Triethylene glycol-n-butyl ether | 0.008 | 4.0 | 4.0 | 4.0 |
|  | SUNNOL (trade name) NL-1430 (*2) |  | 0.2 | 0.2 | 0.2 |
|  | OLFIN (trade name) E1010 (*3) |  | 0.2 | 0.2 | 0.2 |
|  | Water |  | balance | balance | balance |
| Dye/Pigment (D/P) |  |  | 0.22 | 0.29 | 0.17 |
| Migration |  |  | A | A | A |
| Chromogenic property (chromaticness) |  |  | A | A | A |
| Chromogenic property (hue angle) |  |  | A | A | A |
| Storing stability |  |  | A | A | A |
| Water resistance |  |  | A | A | A |

LEGEND
(*1) Water dispersion of C.I. Pigment Red 122, containing 4% by weight of a resin for dispersing pigment; numerals in parentheses indicate the quinacridone ratio.
(*2) Anionic surfactant produced by LION CORPORATION; numerals in parentheses indicate the active ingredient amount.
(*3) Nonionic surfactant produced by NISSHIN CHEMICAL CO., LTD.; numerals in parentheses indicate the active ingredient amount.

As indicated in TABLE 3, Examples 1-1 to 1-3 each of which used the dye represented by the formula (1) all had quite satisfactory results in all of the evaluations of the migration, the chromogenic property (chromaticness), the chromogenic property (hue angle), the storing stability and the water resistance.

Example 2-1 and Comparative Examples 2-1 to 2-3

Example 2-1 is an example in which the dye represented by the formula (1) was changed. Components, except for the liquid pigment dispersion 1, which were included in Water-based Ink Composition (TABLE 4) as indicated below were mixed uniformly or homogeneously; and thus an ink solvent was obtained. Subsequently, the ink solvent was added to the liquid pigment dispersion 1, followed by being mixed uniformly. After that, the obtained mixture was filtrated through a cellulose acetate membrane filter (pore size 3.00 μm) produced by TOYO ROSHI KAISHA, LTD., and thus a water-based ink for ink-jet recording of each of Example 2-1 and Comparative Examples 2-1 to 2-3 was obtained. Note that in TABLE 4, the dye (1-2) indicates the compound represented by the formula (1-2).

The water-based inks of Example 2-1 and Comparative Examples 2-1 to 2-3 were evaluated regarding the migration, the chromogenic property (chromaticness), the chromogenic property (hue angle), the storing stability and the water resistance, in a similar manner as the evaluations made for Examples 1-1 to 1-3.

The water-based ink compositions and the evaluation results of the water-based inks of Example 2-1 and Comparative Examples 2-1 to 2-3 are indicated in TABLE 4 below. Note that TABLE 4 also indicates the water-based ink composition and the results of evaluations for the water-based ink of Example 1-1, as well.

TABLE 4

|  |  |  | EXAMPLES | | COMPARATIVE EXAMPLES | | |
|---|---|---|---|---|---|---|---|
|  |  |  | 1-1 | 2-1 | 2-1 | 2-2 | 2-3 |
| Water-based Ink Composition (% by weight) | Liquid pigment dispersion 1 (*1) |  | 37.50 (4.5) | 37.50 (4.5) | 37.50 (4.5) | 37.50 (4.5) | 37.50 (4.5) |
|  | Dye (1-1) |  | 1.0 | — | — | — | — |
|  | Dye (1-2) |  | — | 1.0 | — | — | — |
|  | C.I. Acid Red 289 |  | — | — | — | 1.0 | — |
|  | C.I. Acid Red 52 |  | — | — | — | — | 1.0 |
|  |  | Vapor Pressure (mmHg) |  |  |  |  |  |
|  | Glycerol | <0.001 | 18.0 | 20.0 | 20.0 | 22.0 | 22.00 |
|  | Triethylene glycol-n-butyl ether | 0.008 | 4.0 | 4.0 | 4.0 | 4.0 | 4.0 |
|  | SUNNOL (trade name) NL-1430 (*2) |  | 0.2 | 0.2 | 0.2 | 0.2 | 0.2 |
|  | OLFIN (trade name) E1010 (*3) |  | 0.2 | 0.2 | 0.2 | 0.2 | 0.2 |
|  | Water |  | balance | balance | balance | balance | balance |
| Dye/Pigment (D/P) |  |  | 0.22 | 0.22 | — | 0.22 | 0.22 |
| Migration |  |  | A | A | A | C | C |
| Chromogenic property (chromaticness) |  |  | A | A | C | A | A |
| Chromogenic property (hue angle) |  |  | A | A | A | A | C |

TABLE 4-continued

|  | EXAMPLES | | COMPARATIVE EXAMPLES | | |
|---|---|---|---|---|---|
|  | 1-1 | 2-1 | 2-1 | 2-2 | 2-3 |
| Storing stability | A | A | A | A | A |
| Water resistance | A | A | A | B | B |

TABLE 4 (following) - LEGEND
(*1): Water dispersion of C.I. Pigment Red 122, containing 4% by weight of a resin for dispersing pigment; numerals in parentheses indicate the quinacridone ratio.
(*2): Anionic surfactant produced by LION CORPORATION; numerals in parentheses indicate the active ingredient amount.
(*3): Nonionic surfactant produced by NISSHIN CHEMICAL CO., LTD.; numerals in parentheses indicate the active ingredient amount.

As indicated in TABLE 4, Example 2-1 which used the dye represented by the formula (1) all had quite satisfactory results in all of the evaluations of the migration, the chromogenic property (chromaticness), the chromogenic property (hue angle), the storing stability and the water resistance. On the other hand, Comparative Example 2-1 which did not use the dye represented by the formula (1) had unsatisfactory result in the evaluation of the chromogenic property (chromaticness). Further, Comparative Example 2-2 which used C. I. Acid Red 289 rather than using the dye represented by the formula (1) had unsatisfactory result in the evaluation of the migration. Furthermore, Comparative Example 2-3 which used C. I. Acid Red 52 rather than using the dye represented by the formula (1) had unsatisfactory results in the evaluations of the migration and the chromogenic property (hue angle). From these results, it is presumed that the dye represented by the formula (1) in the water-based ink hardly migrates, and improves the chromogenic properties (chromaticness, hue angle) in the recorded matter.

Examples 3-1 and 3-2

Examples 3-1 and 3-2 are each an example in which at least one of the quinacridone and the derivative thereof was changed. Components, except for the liquid pigment dispersion, which were included in Water-based Ink Composition (TABLE 5) as indicated below were mixed uniformly or homogeneously; and thus an ink solvent was obtained. Subsequently, the ink solvent was added to the liquid pigment dispersion, followed by being mixed uniformly. After that, the obtained mixture was filtrated through a cellulose acetate membrane filter (pore size 3.00 μm) produced by TOYO ROSHI KAISHA, LTD., and thus a water-based ink for ink-jet recording of each of Examples 3-1 and 3-2 was obtained. Note that in TABLE 5, the liquid pigment dispersions 2 and 3 were each a liquid pigment dispersion using at least one of quinacridone and a derivative thereof which was/were made to be self-dispersible by a chemical processing, without containing any pigment-dispersing resin.

The water-based inks of Example 3-1 and 3-2 were evaluated regarding the migration, the chromogenic property (chromaticness), the chromogenic property (hue angle), the storing stability and the water resistance, in a similar manner as the evaluations made for Examples 1-1 to 1-3.

The water-based ink compositions and the evaluation results of the water-based inks of Examples 3-1 and 3-2 are indicated in TABLE 5 below. Note that TABLE 5 also indicates the water-based ink composition and the results of evaluations for the water-based ink of Example 1-1, as well.

TABLE 5

|  |  |  | EXAMPLES | | |
|---|---|---|---|---|---|
|  |  |  | 1-1 | 3-1 | 3-2 |
| Water-based Ink Composition (% by weight) | Liquid pigment dispersion 1 (*1) |  | 37.50 (4.5) | — | — |
|  | Liquid pigment dispersion 2 (*4) |  | — | 37.50 (4.5) | — |
|  | Liquid pigment dispersion 3 (*5) |  | — | — | 37.50 (4.5) |
|  | Dye (1-1) |  | 1.0 | 1.0 | 1.0 |
|  |  | Vapor Pressure (mmHg) |  |  |  |
|  | Glycerol | <0.001 | 18.0 | 16.0 | 18.0 |
|  | Triethylene glycol-n-butyl ether | 0.008 | 4.0 | 4.0 | 4.0 |
|  | SUNNOL (trade name) NL-1430 (*2) |  | 0.2 | 0.2 | 0.2 |
|  | OLFIN (trade name) E1010 (*3) |  | 0.2 | 0.2 | 0.2 |
|  | Water |  | balance | balance | balance |
| Dye/Pigment (D/P) |  |  | 0.22 | 0.22 | 0.22 |
| Migration |  |  | A | A | A |
| Chromogenic property (chromaticness) |  |  | A | A | A |
| Chromogenic property (hue angle) |  |  | A | B | A |

TABLE 5-continued

|  | EXAMPLES | | |
|---|---|---|---|
|  | 1-1 | 3-1 | 3-2 |
| Storing stability | A | B | B |
| Water resistance | A | A | A |

LEGEND
(*1): Water dispersion of C.I. Pigment Red 122, containing 4% by weight of a resin for dispersing pigment; numerals in parentheses indicate the quinacridone ratio.
(*4): Prepared by using, as a pigment, C.I. Pigment Violet 19, with the method described in Published Japanese Translation of PCT International Publication for Patent Application No. 2009-515007 corresponding to the United States Patent Application Publication Nos. US2007/0100023 and US 2007/0100024; numerals in parentheses indicate quinacridone ratio.
(*5): Prepared by using, as a pigment, C.I. Pigment Red 122, with the method described in Publication Japanese Translation of PCT International Publication for Patent Application No. 2009-515007 corresponding to the United States Patent Application Publication Nos. US2007/0100023 and US 2007/0100024; numerals in parentheses indicate quinacridone ratio.
(*2): Anionic surfactant produced by LION CORPORATION; numerals in parentheses indicate the active ingredient amount.
(*3): Nonionic surfactant produced by NISSHIN CHEMICAL CO., LTD.; numerals in parentheses indicate the active ingredient amount.

As indicated in TABLE 5, Examples 3-1 and 3-2 both had satisfactory results in all of the evaluations of the migration, the chromogenic property (chromaticness), the chromogenic property (hue angle), the storing stability and the water resistance. Note that, however, Examples 3-1 and 3-2 using the water pigment dispersion 2 and 3, respectively, each containing the self-dispersible pigment had a storing stability which was unsatisfactory to some extent as compared with Example 3-1 using the liquid pigment dispersion 1 in which the pigment was dispersed in water by the pigment-dispersing resin. From these results, it is presumed that a case of dispersing the pigment by using the pigment-dispersing resin improves the storing stability than in a case of using the self-dispersible pigment. Further, Example 3-1 using C.I. Pigment Violet 19 had a chromogenic property (hue angle) which was unsatisfactory to some extent as compared with Examples 1-1 and 3-2 each using C.I. Pigment Red 122. From these results, it is presumed that the chromogenic property (hue angle) in the recorded matter is improves by using C.I. Pigment Red 122.

Examples 4-1 to 4-4

Examples 4-1 to 4-4 are each an example in which the weight ratio D/P was changed. Components, except for the liquid pigment dispersion 1, which were included in Water-based Ink Composition (TABLE 6) as indicated below were mixed uniformly or homogeneously; and thus an ink solvent was obtained. Subsequently, the ink solvent was added to the liquid pigment dispersion 1, followed by being mixed uniformly. After that, the obtained mixture was filtrated through a cellulose acetate membrane filter (pore size 3.00 μm) produced by TOYO ROSHI KAISHA, LTD., and thus a water-based ink for ink-jet recording of each of Examples 4-1 to 4-4 was obtained.

The water-based inks of Example 4-1 to 4-4 were evaluated regarding the migration, the chromogenic property (chromaticness), the chromogenic property (hue angle), the storing stability and the water resistance, in a similar manner as the evaluations made for Examples 1-1 to 1-3.

The water-based ink compositions and the evaluation results of the water-based inks of Examples 4-1 to 4-4 are indicated in TABLE 6 below. Note that TABLE 6 also indicates the water-based ink composition and the results of evaluations for the water-based ink of Example 1-1, as well.

TABLE 6

|  |  |  | EXAMPLES | | | | |
|---|---|---|---|---|---|---|---|
|  |  |  | 4-1 | 4.2 | 1-1 | 4-3 | 4-4 |
| Water-based Ink Composition (% by weight) | Liquid pigment dispersion 1 (*1) |  | 37.50 (4.5) | 37.50 (4.5) | 37.50 (4.5) | 37.50 (4.5) | 37.50 (4.5) |
|  | Dye (1-1) |  | 0.3 | 0.5 | 1 | 1.5 | 1.9 |
|  |  | Vapor Pressure (mmHg) |  |  |  |  |  |
|  | Glycerol | <0.001 | 20.0 | 18.0 | 18.0 | 16.0 | 18.0 |
|  | Triethylene glycol-n-butyl ether | 0.008 | 4.0 | 4.0 | 4.0 | 4.0 | 4.0 |
|  | SUNNOL (trade name) NL-1430 (*2) |  | 0.2 | — | 0.2 | 0.2 | 0.2 |
|  | NEOPELEX (trade name) G-15 (*6) |  | — | 0.4 | — | — | — |
|  | OLFIN (trade name) E1010 (*3) |  | 0.2 | 0.2 | 0.2 | 0.2 | 0.2 |
|  | Water |  | balance | balance | balance | balance | balance |
| Dye/Pigment (D/P) |  |  | 0.07 | 0.11 | 0.22 | 0.33 | 0.42 |
| Migration |  |  | A | A | A | A | A |
| Chromogenic property (chromaticness) |  |  | B | A | A | A | A |
| Chromogenic property (hue angle) |  |  | A | A | A | A | A |

TABLE 6-continued

| | EXAMPLES | | | | |
|---|---|---|---|---|---|
| | 4-1 | 4.2 | 1-1 | 4-3 | 4-4 |
| Storing stability | A | A | A | A | A |
| Water resistance | A | A | A | A | B |

TABLE 6 (following) - LEGEND
(*1): Water dispersion of C.I. Pigment Red 122, containing 4% by weight of a resin for dispersing pigment; numerals in parentheses indicate the quinacridone ratio.
(*2): Anionic surfactant produced by LION CORPORATION; numerals in parentheses indicate the active ingredient amount.
(*6): Anionic surfactant produced by KAO CORPORATION; numerals in parentheses indicate the active ingredient amount.
(*3): Nonionic surfactant produced by NISSHIN CHEMICAL CO., LTD.; numerals in parentheses indicate the active ingredient amount.

As indicated in TABLE 6, Examples 4-1 to 4-4 had satisfactory results in all of the evaluations of the migration, the chromogenic property (chromaticness), the chromogenic property (hue angle), the storing stability and the water resistance. In particular, Examples 4-2, 1-1 and 4-3 in each of which the weight ration D/P was in a range of D/P=0.08 to 0.4 and the blending amount of the dye represented by the formula (1) was in a range of 0.5% by weight to 1.5% by weight had quite satisfactory results in all of the evaluations of the migration, the chromogenic property (chromaticness), the chromogenic property (hue angle), the storing stability and the water resistance.

Examples 5-1 to 5-4

Examples 5-1 to 5-4 are each an example in which the blending amount and the kind of the water-soluble organic solvent were changed. Components, except for the liquid pigment dispersion 1, which were included in Water-based Ink Composition (TABLE 7) as indicated below were mixed uniformly or homogeneously; and thus an ink solvent was obtained. Subsequently, the ink solvent was added to the liquid pigment dispersion 1, followed by being mixed uniformly. After that, the obtained mixture was filtrated through a cellulose acetate membrane filter (pore size 3.00 μm) produced by TOYO ROSHI KAISHA, LTD., and thus a water-based ink for ink-jet recording of each of Examples 5-1 to 5-4 was obtained.

The water-based inks of Example 5-1 to 5-4 were evaluated regarding the migration, the chromogenic property (chromaticness), the chromogenic property (hue angle), the storing stability and the water resistance, in a similar manner as the evaluations made for Examples 1-1 to 1-3.

The water-based ink compositions and the evaluation results of the water-based inks of Examples 5-1 to 5-4 are indicated in TABLE 7 below. Note that TABLE 7 also indicates the water-based ink composition and the results of evaluations for the water-based ink of Example 1-1, as well.

TABLE 7

| | | | EXAMPLES | | | | |
|---|---|---|---|---|---|---|---|
| | | | 1-1 | 5-1 | 5-2 | 5-3 | 5-4 |
| Water-based Ink Composition (% by weight) | Liquid pigment dispersion 1 (*1) | | 37.50 (4.5) | 37.50 (4.5) | 37.50 (4.5) | 37.50 (4.5) | 37.50 (4.5) |
| | Dye (1-1) | | 1.0 | 1.0 | 1.0 | 1.0 | 1.0 |
| | | Vapor Pressure (mmHg) | | | | | |
| | Glycerol | <0.001 | 18.0 | 25.0 | 35.0 | — | — |
| | Triethylene glycol | 0.001 | — | — | — | 25.0 | 35.0 |
| | Triethylene glycol-n-butyl ether | 0.008 | 4.0 | 4.0 | 4.0 | 4.0 | 4.0 |
| | SUNNOL (trade name) NL-1430 (*2) | | 0.2 | 1.0 | 1.0 | 1.0 | 1.0 |
| | OLFIN (trade name) E1010 (*3) | | 0.2 | 0.2 | 0.2 | 0.2 | 0.2 |
| | Water | | balance | balance | balance | balance | balance |
| Dye/Pigment (D/P) | | | 0.22 | 0.22 | 0.22 | 0.22 | 0.22 |
| Migration | | | A | A | B | A | B |
| Chromogenic property (chromaticness) | | | A | A | A | A | A |
| Chromogenic property (hue angle) | | | A | A | A | A | A |
| Storing stability | | | A | A | A | A | A |
| Water resistance | | | A | A | A | A | A |

TABLE 7 (following) - LEGEND
(*1): Water dispersion of C.I. Pigment Red 122, containing 4% by weight of a resin for dispersing pigment; numerals in parentheses indicate the quinacridone ratio.
(*2): Anionic surfactant produced by LION CORPORATION; numerals in parentheses indicate the active ingredient amount.
(*3); Nonionic surfactant produced by NISSHIN CHEMICAL CO., LTD.; numerals in parentheses indicate the active ingredient amount.

As indicated in TABLE 7, Examples 5-1 to 5-4 had satisfactory results in all of the evaluations of the migration, the chromogenic property (chromaticness), the chromogenic property (hue angle), the storing stability and the water resistance. In particular, Examples 1-1, 5-1 and 5-3 in each of which the blending amount of the humectant having the vapor pressure of not more than 0.002 mmHg was not more than 25% by weight had quite satisfactory results in all of the migration, the chromogenic property (chromaticness), the chromogenic property (hue angle), the storing stability and the water resistance.

As described above, the water-based ink related to the present teaching is capable of realizing both of the improvement in chromogenic property and the suppression of migration. The usage of the water-based ink related to the present teaching is not particularly limited, and is widely applicable to a variety of kinds of ink-jet recording.

What is claimed is:

1. A water-based ink for ink-jet recording comprising:
water;
at least one of quinacridone and a derivative thereof;
a pigment-dispersing resin; and
a dye represented by the following formula (1):

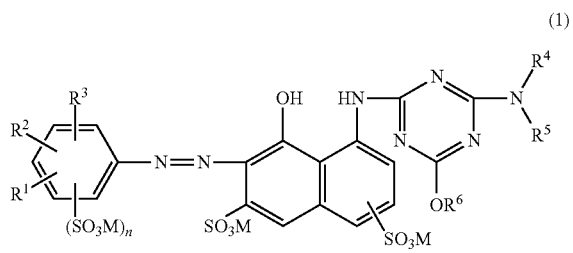

(1)

wherein in the formula (1),
"n" is 0, 1 or 2;
each of $R^1$, $R^2$ and $R^3$ is one selected from the group consisting of: a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, sulfonate group, a substituted or non-substituted alkylsulfonyl group, a substituted or non-substituted arylsulfonyl group, a carboxy group and a carboxylate group;
$R^1$, $R^2$ and $R^3$ are same as one another or different from one another;
each of $R^4$, $R^5$ and $R^6$ is one selected from the group consisting of: a hydrogen atom, a substituted or non-substituted alkyl group, a substituted or non-substituted alkenyl group, a substituted or non-substituted aryl group, a substituted or non-substituted aralkyl group, a substituted or non-substituted alicyclic group, and a substituted or non-substituted heterocyclic group;
$R^4$, $R^5$ and $R^6$ are same as one another or different from one another;
each of three Ms is one selected from the group consisting of: H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, and $C_2H_4NH_2$; and
the three Ms are same as one another or different from one another.

2. The water-based ink for ink-jet recording according to claim 1, wherein any one of $R^1$ to $R^6$ has an acid group, and the acid group is non-neutralized acid or salt thereof.

3. The water-based ink for ink-jet recording according to claim 1, wherein the at least one of the quinacridone and the derivative thereof is C. I. Pigment Red 122.

4. The water-based ink for ink-jet recording according to claim 1
wherein the at least one of the quinacridone and the derivative thereof is dispersed in the water by the pigment-dispersing resin.

5. The water-based ink for ink-jet recording according to claim 1, wherein a weight ratio of a blending amount of the dye represented by the formula (1) in the water-based ink to a blending amount of the at least one of the quinacridone and the derivative thereof in the water-based ink is in a range of 0.08 to 0.4.

6. The water-based ink for ink-jet recording according to claim 1, wherein the dye represented by the formula (1) is contained in the water-based ink in a range of 0.5% by weight to 1.5% by weight.

7. The water-based ink for ink-jet recording according to claim 1, wherein weight ratio of a blending amount of the dye represented by the formula (1) in the water-based ink to a blending amount of the at least one of the quinacridone and the derivative thereof in the water-based ink is in a range of 0.08 to 0.4; and
the dye represented by the formula (1) is contained in the water-based ink in a range of 0.5% by weight to 1.5% by weight.

8. The water-based ink for ink-jet recording according to claim 1, further comprising a humectant of which vapor pressure is not more than 0.002 mmHg,
wherein a blending amount of the humectant in the water-based ink is not more than 25% by weight.

9. The water-based ink for ink-jet recording according to claim 8, wherein the humectant is at least one of glycerol and triethylene glycol.

10. The water-based ink for ink-jet recording according to claim 1, wherein in the formula (1):
n is 0;
$R^1$ is one selected from the group consisting of: a carboxy group, a carbamoyl group, a trifluoromethyl group, and a sulfamoyl group;
each of $R^2$, $R^3$ and $R^5$ is a hydrogen atom;
$R^4$ is one selected from the group consisting of: a phenyl group, a phenyl group substituted by a carboxy group or a sulfamoyl group, and a carboxy alkyl group; and
$R^6$ is a hydrogen atom or an alkyl group.

11. The water-based ink for ink-jet recording according to claim 1, wherein the dye represented by the formula (1) is any one of compounds represented by the following formulae (1-1) to (1-5):

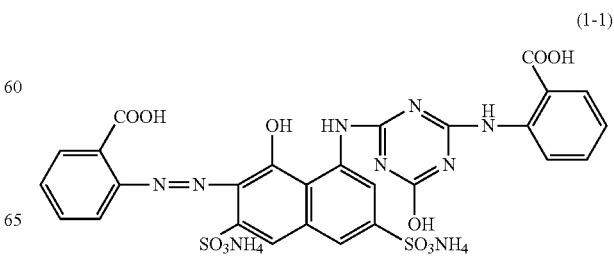

(1-1)

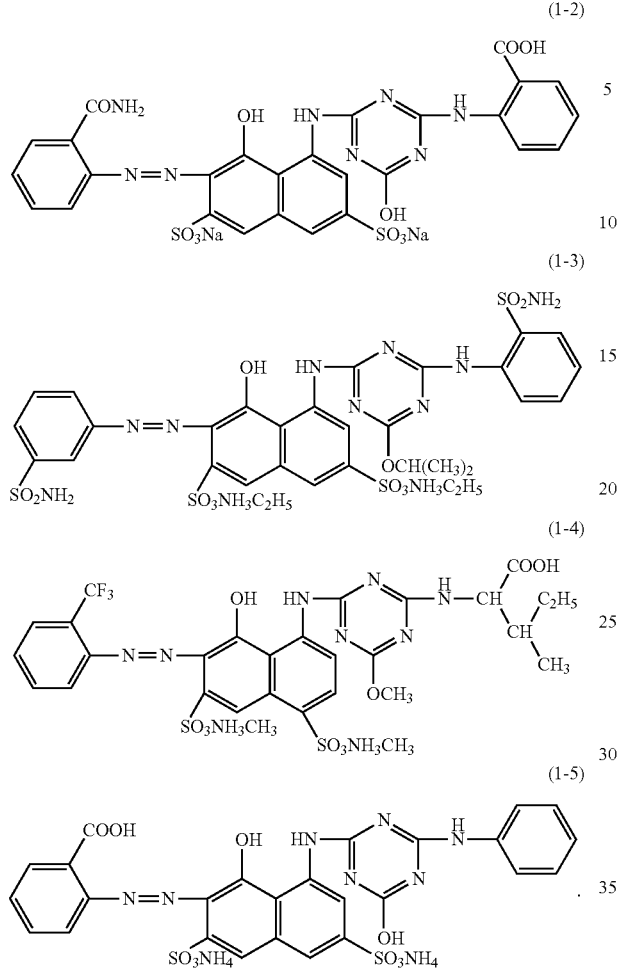

12. An ink cartridge comprising the water-based ink for ink-jet recording as defined in claim 1.

13. A water-based ink for ink-jet recording comprising:
water;
at least one of quinacridone and a derivative thereof;
a pigment-dispersing resin which has an ethylene oxide chain; and
a dye represented by the following formula (1):

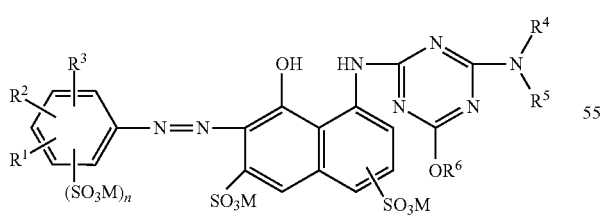

wherein in the formula (1),
"n" is 0, 1 or 2;
each of $R^1$, $R^2$ and $R^3$ is one selected from the group consisting of: a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, sulfonate group, a substituted or non-substituted alkylsulfonyl group, a substituted or non-substituted arylsulfonyl group, a carboxy group and a carboxylate group;
$R^1$, $R^2$ and $R^3$ are same as one another or different from one another;
each of $R^4$, $R^5$ and $R^6$ is one selected from the group consisting of: a hydrogen atom, a substituted or non-substituted alkyl group, a substituted or non-substituted alkenyl group, a substituted or non-substituted aryl group, a substituted or non-substituted aralkyl group, a substituted or non-substituted alicyclic group, and a substituted or non-substituted heterocyclic group;
$R^4$, $R^5$ and $R^6$ are same as one another or different from one another;
each of three Ms is one selected from the group consisting of: H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, and $C_2H_4NH_2$; and
the three Ms are same as one another or different from one another.

14. The water-based ink for ink-jet recording according to claim 13, wherein acid value of the pigment-dispersing resin is in a range of 40 mgKOH/g to 200 mgKOH/g.

15. The water-based ink for ink-jet recording according to claim 13, wherein molecular weight of the pigment-dispersing resin is in a range of 1,000 to 100,000.

16. The water-based ink for ink-jet recording according to claim 13, wherein weight ratio of a blending amount of the pigment-dispersing resin in the water-based ink to a blending amount of the dye represented by the formula (1) in the water-based ink is not less than 0.3.

17. A water-based ink for ink-jet recording comprising:
water;
at least one of quinacridone and a derivative thereof; and
a dye represented by the following formula (1):

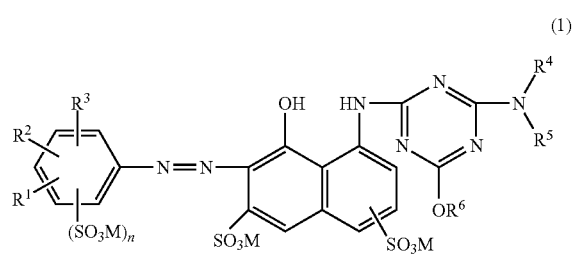

each of $R^1$, $R^2$ and $R^3$ is one selected from the group consisting of: a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, sulfonate group, a substituted or non-substituted alkylsulfonyl group, a substituted or non-substituted arylsulfonyl group, a carboxy group and a carboxylate group;
$R^1$, $R^2$ and $R^3$ are same as one another or different from one another;
each of $R^4$, $R^5$ and $R^6$ is one selected from the group consisting of: a hydrogen atom, a substituted or non-substituted alkyl group, a substituted or nonalkenyl group, a substituted or non-substituted aryl group, a substituted or non-substituted aralkyl group, a substituted or non-substituted alicyclic group, and a substituted or non-substituted heterocyclic group;

$R^4$, $R^5$ and $R^6$ are same as one another or different from one another;

each of three Ms is one selected from the group consisting of: H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, and $C_2H_4NH_2$; and the three Ms are same as one another or different from one another, wherein a weight ratio of a blending amount of the dye represented by the formula (1) in the water-based ink to a blending amount of the at least one of the quinacridone and the derivative thereof in the water-based ink is in a range of 0.08 to 0.4.

18. The water-based ink for ink-jet recording according to claim 17, wherein the at least one of the quinacridone and the derivative thereof is C. I. Pigment Red 122.

19. The water-based ink for ink-jet recording according to claim 17, wherein the dye represented by the formula (1) is contained in the water-based ink in a range of 0.5% by weight to 1.5% by weight.

20. The water-based ink for ink-jet recording according to claim 17, further comprising a humectant of which vapor pressure is not more than 0.002 mmHg, wherein a blending amount of the humectant in the water-based ink is not more than 25% by weight.

* * * * *